(12) United States Patent
Grasselli

(10) Patent No.: US 9,102,428 B2
(45) Date of Patent: Aug. 11, 2015

(54) APPARATUS FOR LAYING SLICED FOODS INTO CONTAINERS

(76) Inventor: Giorgio Grasselli, Albinea (IT)

(*) Notice: Subject to any disclaimer, the term of this patent is extended or adjusted under 35 U.S.C. 154(b) by 727 days.

(21) Appl. No.: 13/332,894

(22) Filed: Dec. 21, 2011

(65) Prior Publication Data

US 2012/0159900 A1 Jun. 28, 2012

(30) Foreign Application Priority Data

Dec. 22, 2010 (IT) .......................... MI2010A002370

(51) Int. Cl.
*B65G 47/68* (2006.01)
*B65B 5/06* (2006.01)
*B65B 25/06* (2006.01)
*B65B 5/10* (2006.01)
*B65B 35/44* (2006.01)
*B65G 47/71* (2006.01)
*B65G 47/90* (2006.01)
*A22C 17/00* (2006.01)

(52) U.S. Cl.
CPC .............. *B65B 25/06* (2013.01); *A22C 17/0093* (2013.01); *B65B 5/06* (2013.01); *B65B 5/101* (2013.01); *B65B 35/44* (2013.01); *B65G 47/715* (2013.01); *B65G 47/90* (2013.01)

(58) Field of Classification Search
CPC .......... B65B 5/06; B65B 5/101; B65B 25/06; B65B 35/44; A22C 17/0093; B65G 47/715; B65G 47/90
USPC ......... 198/457.01, 457.03, 601, 369.1, 369.7, 198/436, 575–577; 53/493, 531, 235
See application file for complete search history.

(56) References Cited

U.S. PATENT DOCUMENTS

| 4,984,677 A | | 1/1991 | Prakken |
| 5,123,231 A | | 6/1992 | Fallas et al. |
| 5,165,218 A | * | 11/1992 | Callahan, Jr. .................. 53/447 |
| 5,810,149 A | * | 9/1998 | Sandberg et al. ........... 198/369.2 |
| 6,659,445 B2 | * | 12/2003 | Boss ............................. 271/9.13 |
| 7,404,478 B2 | * | 7/2008 | Weber ....................... 198/457.03 |
| 7,434,675 B1 | * | 10/2008 | Rohm et al. ................ 198/346.2 |
| 8,118,155 B2 | * | 2/2012 | Noda et al. .................... 198/586 |
| 2002/0146491 A1 | | 10/2002 | Stadtmuller |
| 2004/0159246 A1 | | 8/2004 | Weber |

FOREIGN PATENT DOCUMENTS

| DE | 4319171 A1 | 12/1994 |
| EP | 0381256 A1 | 8/1990 |
| EP | 1234767 A1 | 8/2002 |
| EP | 2030898 A1 | 3/2009 |
| FR | 2346259 A1 | 10/1977 |
| FR | 2621885 A1 | 4/1989 |
| WO | 2005123513 A1 | 12/2005 |

* cited by examiner

*Primary Examiner* — Mark A Deuble
(74) *Attorney, Agent, or Firm* — Pearne & Gordon LLP

(57) ABSTRACT

An apparatus for laying sliced foods (11) into containers (390) comprises a main transport unit (20, 91) and a secondary transport unit (50, 150) downstream of the main unit. The two units are adapted to carry sliced foods (11) from a slicing station to a packaging station.

A control unit (40) controls the individual and combined movements of the two transport units based on at least one arrangement parameter (P1, P2) inputted through a user interface (60).

The apparatus for laying sliced foods (11) into containers (390) receives these foods from a slicing station through a feeding station (80, 180) and causes advancing of same to a laying unit for arrangement in containers (310).

The containers (390) are then routed to a packaging station.

20 Claims, 28 Drawing Sheets

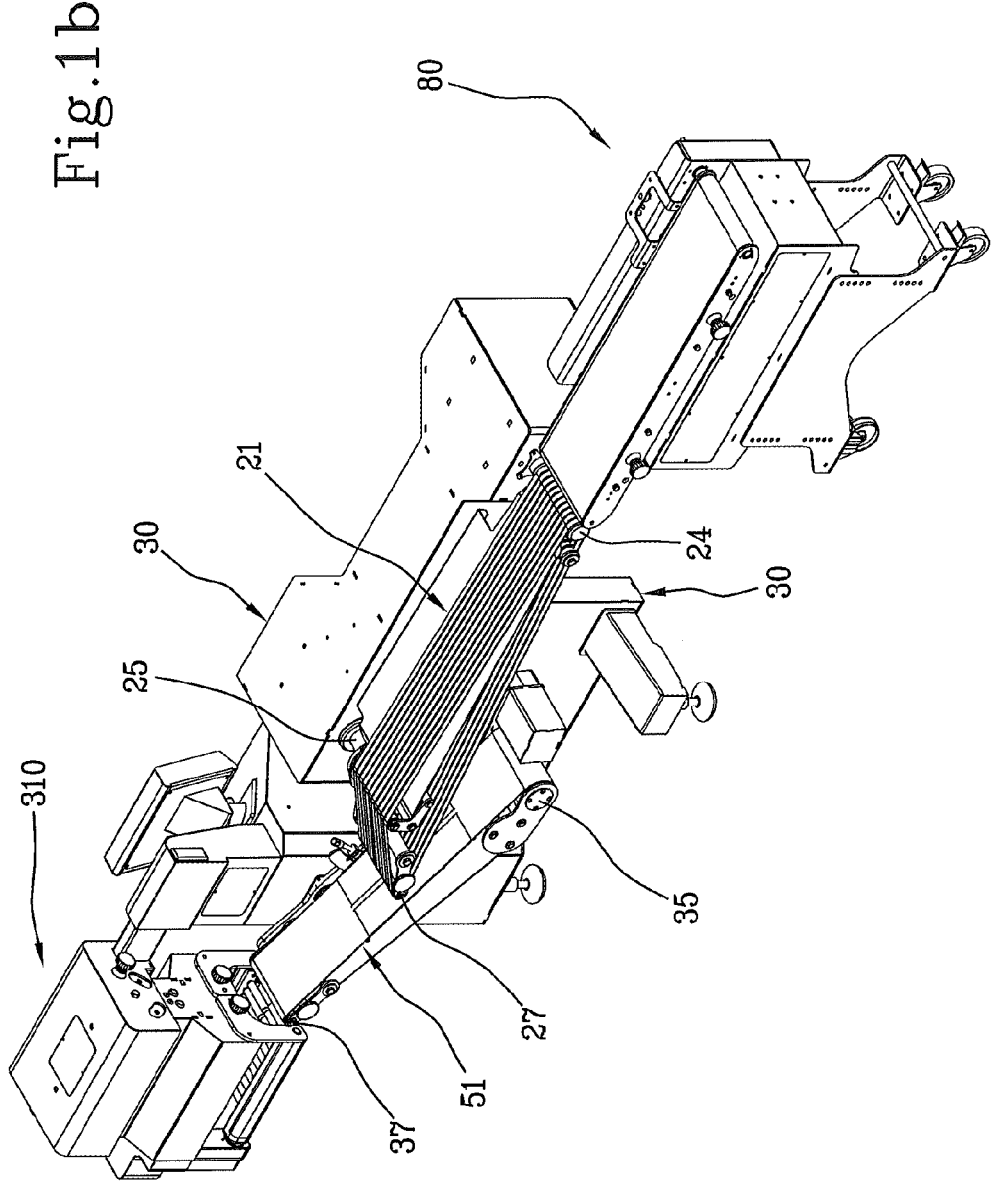

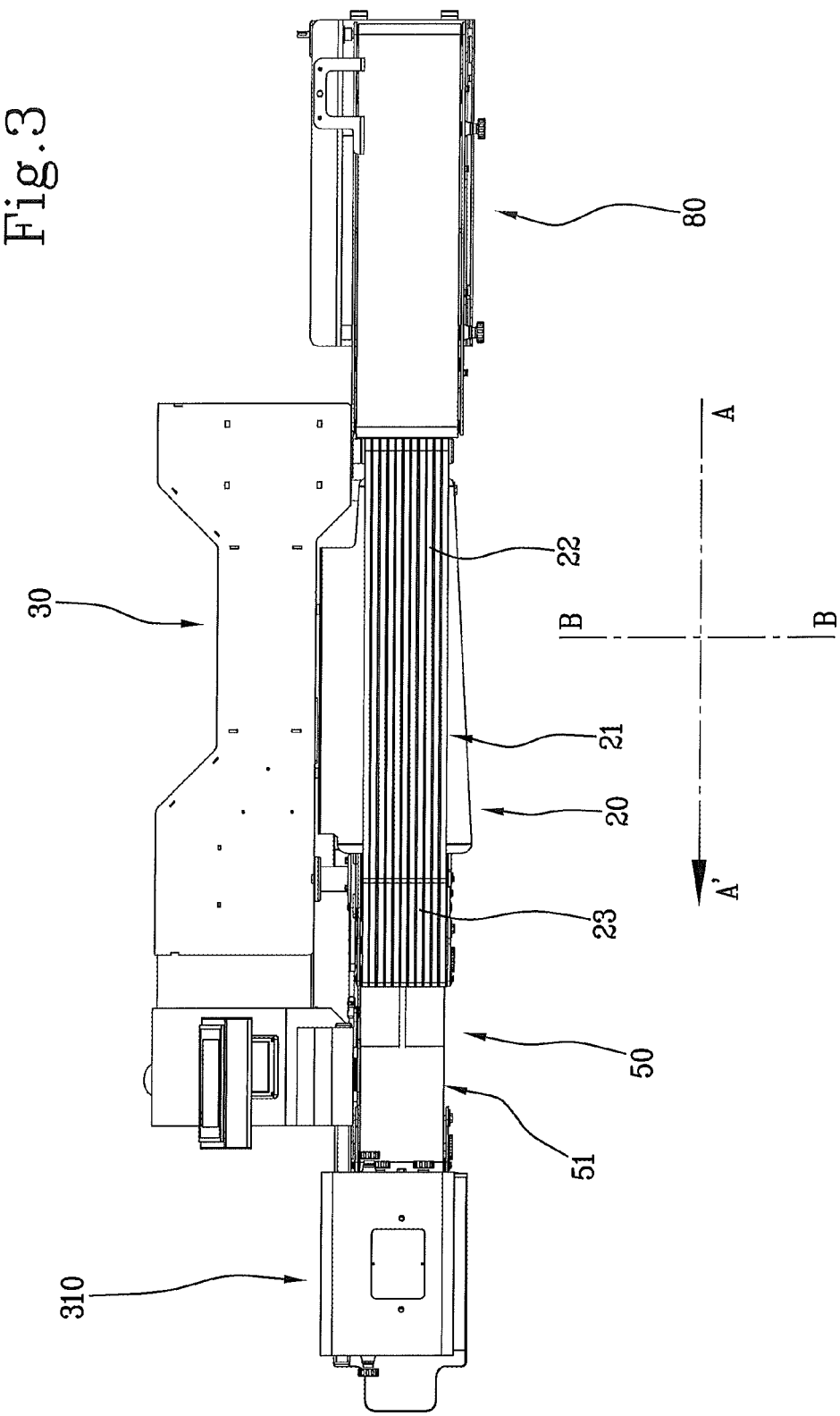

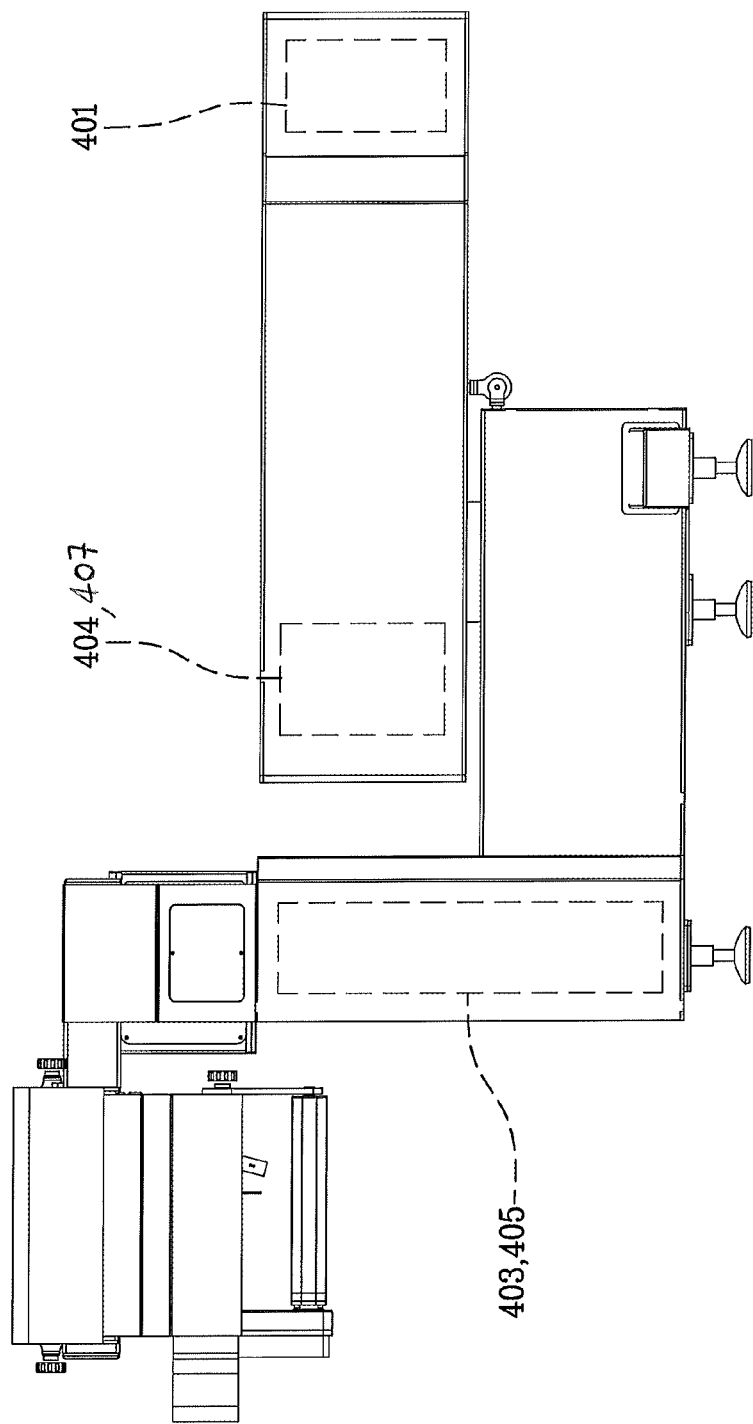

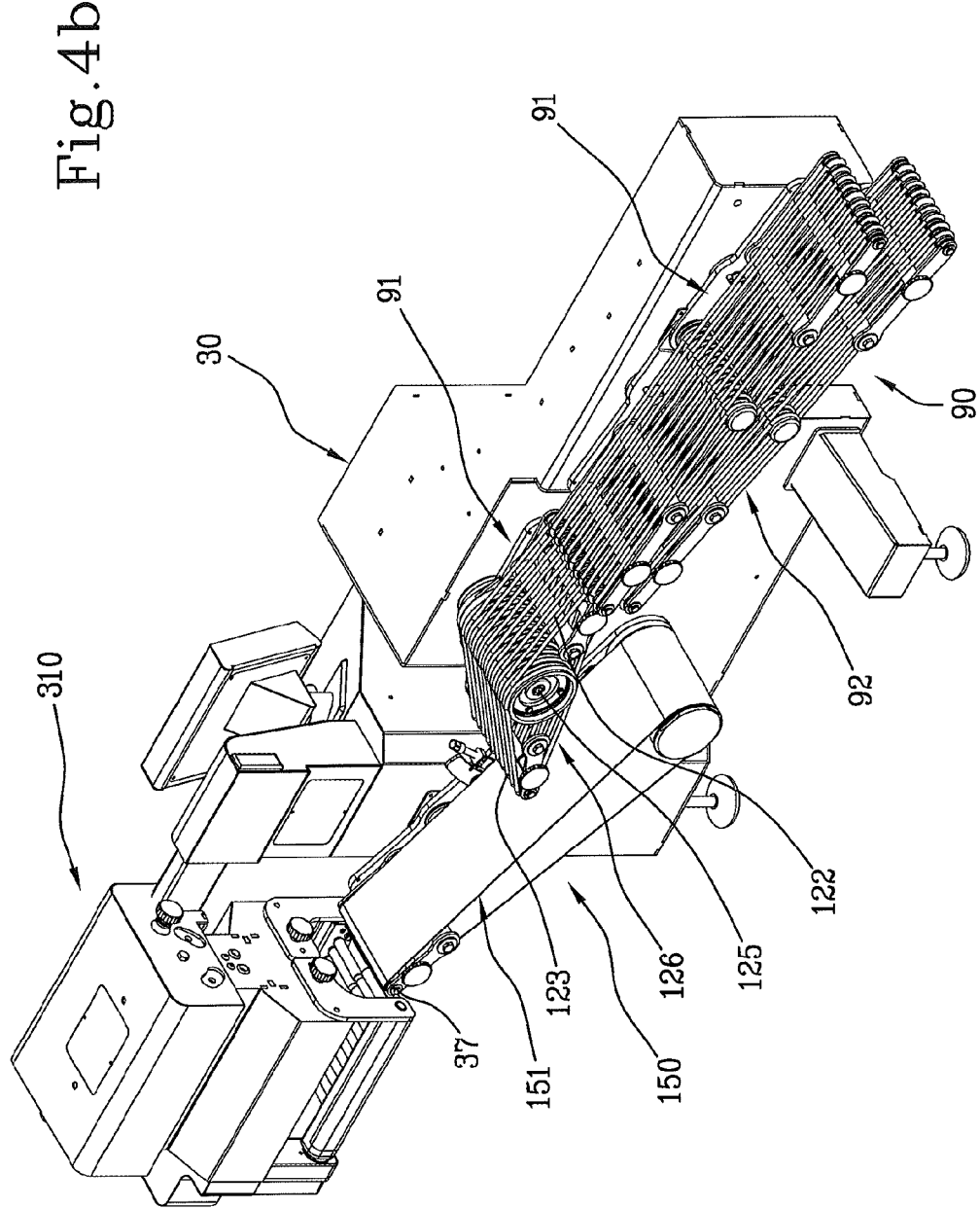

Fig.10
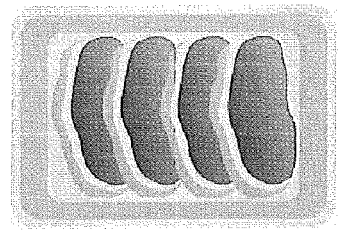 (A)
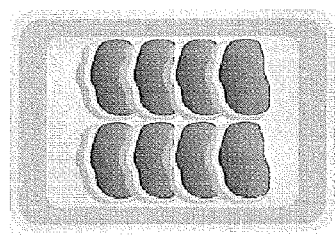 (B)
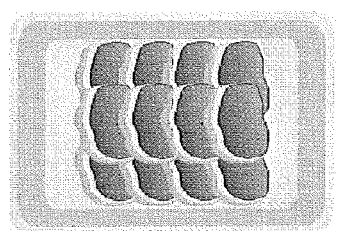 (C)
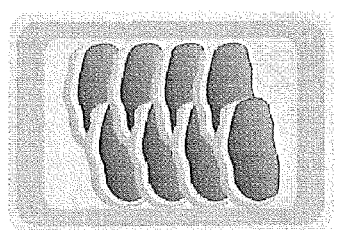 (D)
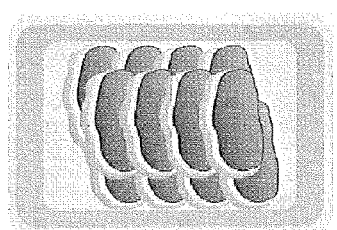 (E)

APPARATUS FOR LAYING SLICED FOODS INTO CONTAINERS

APPLICATION FIELD

The present invention relates to an apparatus for laying sliced foods into containers.

In particular, the invention relates to an apparatus for laying sliced meat into trays for food, and the following description is taken with reference to this application field with the sole aim of simplifying exposition thereof.

KNOWN ART

Commercially available are machines for cutting meat that, starting from parts of a slaughtered animal, produce a certain amount of slices based on predetermined features. These machines only enable selection of cutting features and sizes of the slices without taking care of carrying out orderly storage of same.

The subsequent operation of laying the produced slices into trays is performed manually and separately by the staff in charge.

The present invention aims at providing an apparatus capable of enabling quick and accurate positioning of sliced foods into containers.

Another aim of the present invention is to provide an apparatus capable of enabling selection of arrangement parameters of the sliced foods in the containers.

A further aim of the present invention is to provide an apparatus capable of receiving sliced foods also when temporarily no containers are available and/or when a packaging station is not temporarily working.

A still further aim of the present invention is to provide an apparatus that can be easily assembled and disassembled.

SUMMARY OF THE INVENTION

The foregoing and still further aims are achieved by an apparatus for laying sliced foods into containers, in accordance with the description in the appended claims. The apparatus for laying sliced foods into containers, according to the invention, obtains the following main advantages as compared with the known art:
- it allows quick and accurate arrangement in containers;
- it allows selection of arrangement parameters of the sliced foods in the containers;
- it allows control of characteristic parameters of the sliced foods;
- it is of easy assembling and disassembling;
- it can be configured depend on the food to be treated.

The foregoing and other advantages of the invention will become more apparent from the description taken hereinafter of embodiments given by way of non-limiting examples with reference to the accompanying drawings.

BRIEF DESCRIPTION OF THE DRAWINGS

FIGS. 1a and 1b are perspective views of a first embodiment of the apparatus of the invention;

FIG. 3 is a plan view of the apparatus in FIGS. 1a, 1b;

FIG. 3a is a side view of the apparatus in FIGS. 1a, 1b in which some inner components of the apparatus itself are shown (in dotted line);

FIGS. 4a, 4b are perspective views of a second embodiment of the apparatus of the invention;

FIG. 10 comprises images shown on a user interface of the apparatus of the invention, corresponding to different operating settings of the apparatus itself;

DETAILED DESCRIPTION

Figure 1A:
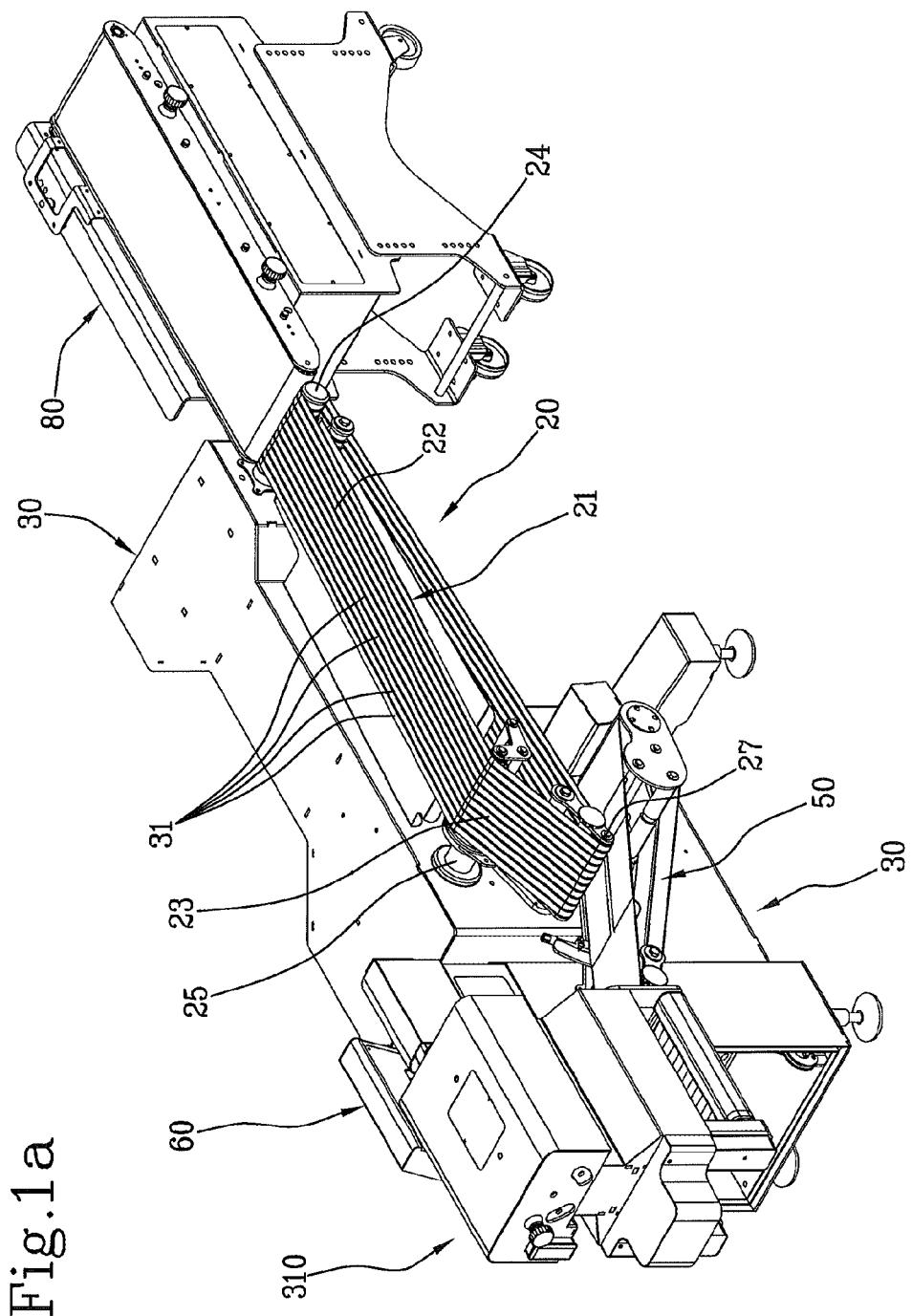

An apparatus for laying sliced foods into containers comprises a main transport unit and a secondary transport unit, downstream of the main unit.

The two units are adapted to carry sliced foods from a slicing station to a packaging station.

A control unit controls the individual and combined movements of the two transports units based on arrangement parameters for the sliced foods inputted through a user interface.

The apparatus for laying sliced foods into containers receives these foods from a slicing station, through a feeding station, and causes feeding in a particular advancing direction towards a laying unit for arrangement inside containers.

The containers are then routed to a packaging station. Optionally, the apparatus comprises a storage unit in which the sliced foods are temporarily stored.

In the following of the specification, the expressions "upstream" and "downstream" will always refer to the advancing direction towards a laying unit for arrangement in containers.

In the preferred embodiments of the invention to be described, the sliced foods comprise sliced meat and the containers for sliced food comprise trays for food. With references to FIGS. 1 to 8, the apparatus for laying meat slices 11 in trays 390 comprises a support structure 30 adapted to support the transport units, control instruments, laying unit for arrangement in trays and storage unit, if any.

In other words, structure 30 constitutes the apparatus frame and is adapted to keep the components of the apparatus itself all together in a single assembly.

The assembly of the transport units and support structure is generally defined as transport station.

A first embodiment of the invention will be now described with general reference to FIGS. 1a, 1b, 2, 2a, 3, 7, 8 and 8a.

The apparatus comprises a first main transport unit 20 for transport of meat slices 11, which is mounted on the support structure 30.

Preferably, the first main transport unit 20 is adapted to carry the meat slices 11 coming from a slicing station, to a first secondary transport unit 50.

Preferably, the meat slices 11 coming out of the slicing station reach the first main transport unit 20 through a first feeding station 80.

Figure 2:
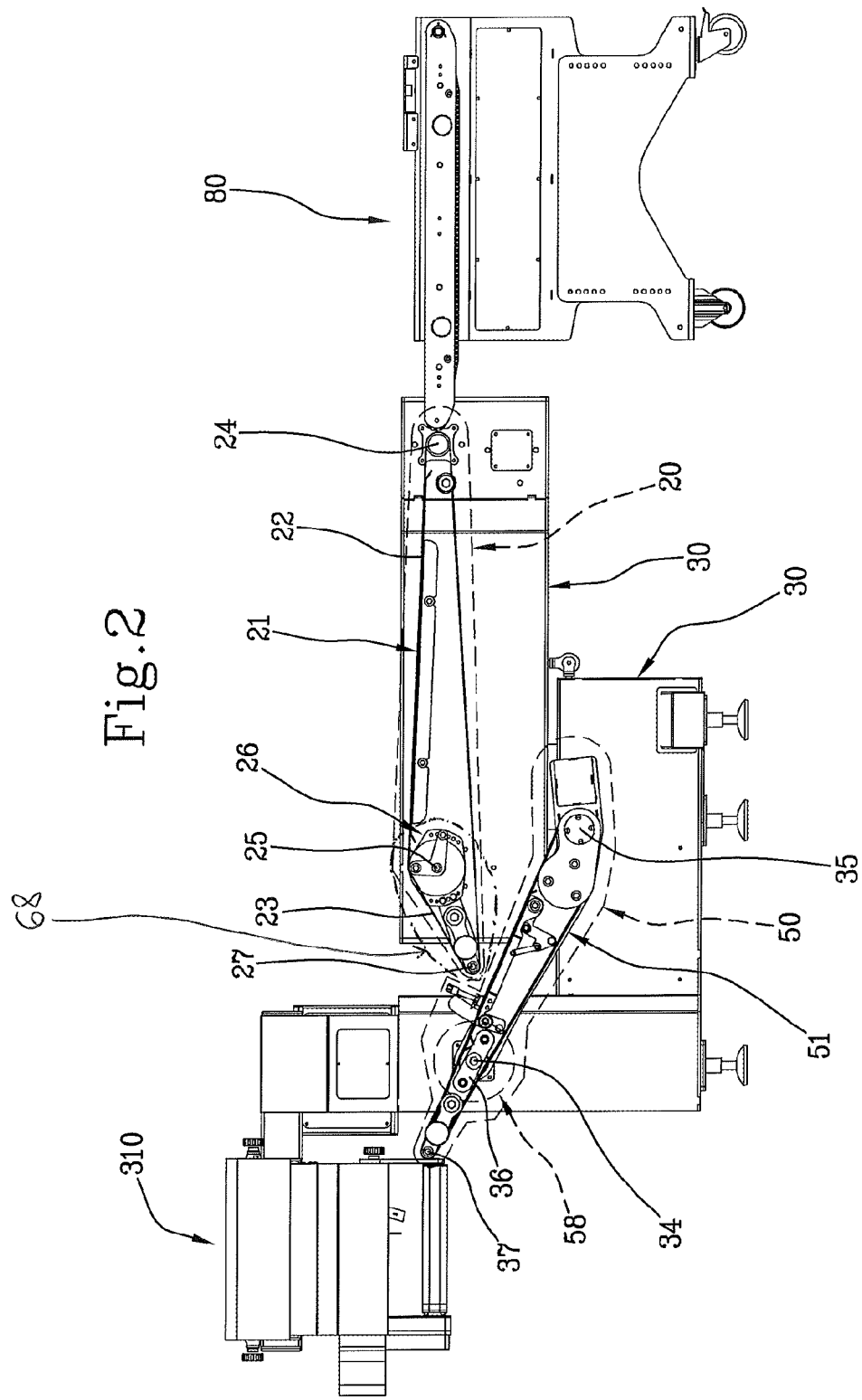
FIG. 2 is a side view of the apparatus in FIGS. 1a, 1b.

The first feeding station 80 is disposed upstream of the first main transport unit 20; for the sake of clarity, the advancing direction A-A' is denoted by an arrow printed in bold type in FIG. 2.

Figure 2A:
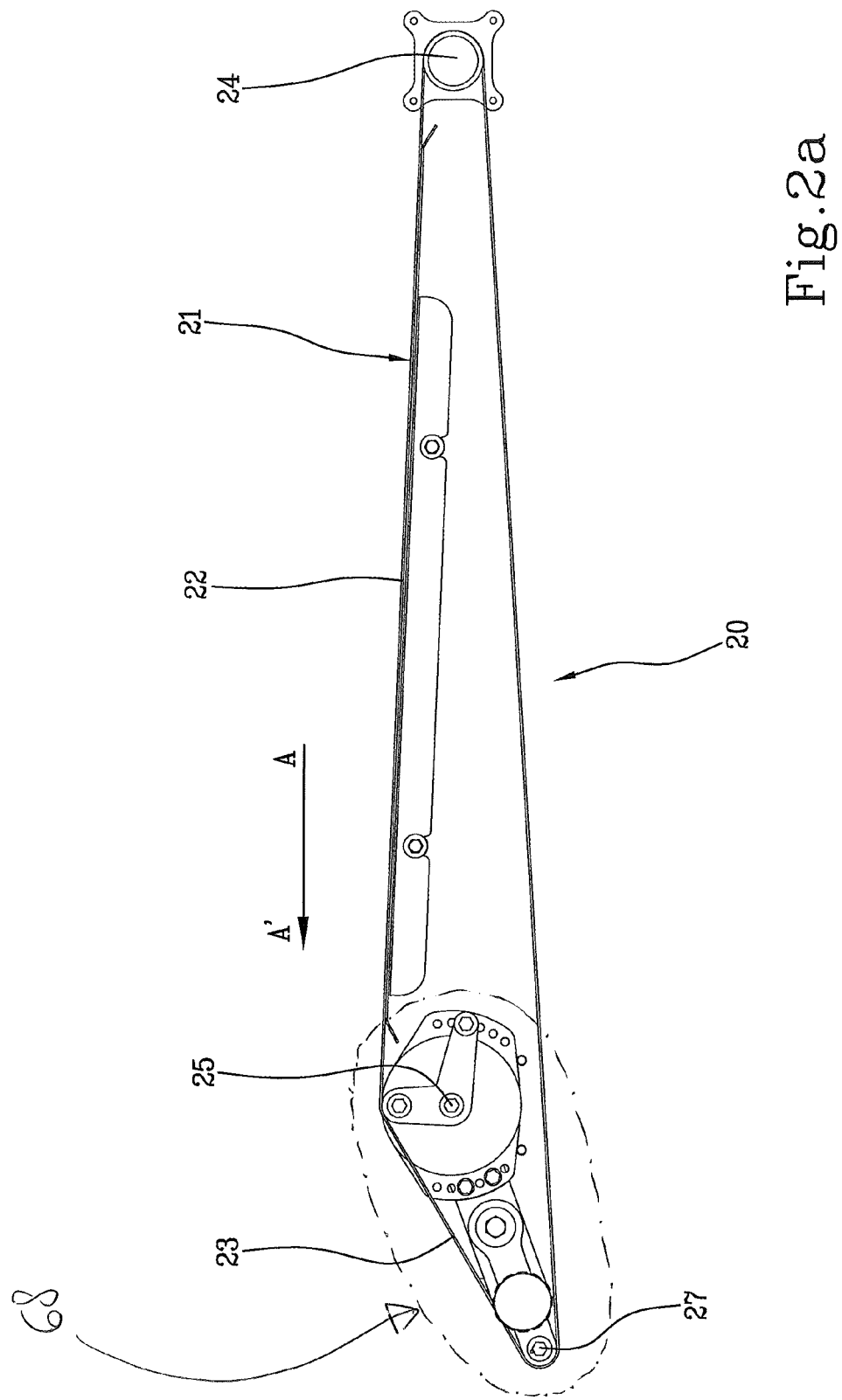
FIG. 2a is a side view of a component of the apparatus in FIG. 2.

The first feeding station 80 is substantially disposed at the same height as the first main transport unit 20. With particular reference to FIG. 2a, the first main transport unit 20 comprises a first main conveyor belt 21, for transport of the sliced foods 11, in particular sliced meat. The main conveyor belt 21 is adapted to run along a sliding plane in the advancing direction A-A' for transport of the sliced foods 11.

According to the invention, the first main conveyor belt 21 is also adapted to translate in a transverse direction B-B relative to the advancing direction A-A', along the sliding plane.

The advancing and transverse-translation directions, A-A' and B-B respectively, are jointly shown in FIG. 3.

Preferably, the main conveyor belt 21 comprises a first initial head 22 and a first final head 23 disposed upstream and downstream respectively relative to the advancing direction A-A' of the meat slices 11.

The first main transport unit 20 according to the invention comprises a first main rotatable driving pin jutting out of the support structure 30 in a direction perpendicular to the sliding plane of the first main conveyor belt 21, at the upstream end of the first initial head 22.

Preferably, fitted on the first main driving pin 24 is a roller to which the first main conveyor belt 21, in particular the initial head 22, adheres.

Due to the action of the first main driving pin 24, the roller acts as a driving roller transmitting a rotary motion to the first conveyor belt 21 to enable moving forward thereof.

The main transport unit 20 comprises a main rotatable driven pin 27 at the downstream end of the first final head 23.

Preferably, fitted on the main driven pin 27 is a roller to which the first main conveyor belt 21, in particular the final head 23, adheres.

Due to the action of the main rotatable driven pin 27, this roller acts as a driven roller enabling the first conveyor belt 21 to rotate based on the movement imparted by the first main driving pin 24.

The main transport unit 20 according to the invention comprises a rotatable supporting pin 25 jutting out of the support structure 30, in a direction perpendicular to the sliding plane of the first main conveyor belt 21.

The supporting pin 25 is constrained in rotation to the support structure 30 at the downstream end of the first initial head 22 that is coincident with the upstream end of the first final head 23.

The apparatus according to the invention comprises a derailleur 26 associated with the supporting pin 25.

The derailleur 26 is adapted to cause translation of the main conveyor belt 21 along the longitudinal axis of the supporting pin 25, coincident with the transverse direction B-B.

Preferably, the first initial head 22 is fixed.

More specifically, the sliding plane of the first initial head 22 is substantially horizontal.

Preferably, the first final head 23 is inclined.

The inclination angle is a parameter mechanically set during assembling of the apparatus.

The first final head 23 is inclined so as to facilitate unloading of the sliced foods 11 onto the first secondary conveyor belt 51.

Preferably, the main conveyor belt 21 is made up of elastic belts 31 (FIG. 1a).

Preferably, the elastic belts 31 are constrained in rotation to said first heads 22, 23. Preferably, the elastic belts 31 are further constrained in rotation to the derailleur 26.

The apparatus of the invention comprises a first electromechanical actuator 401 (FIG. 3a) adapted to operate rotation of the first rotatable main driving pin 24.

In the specification of the invention, by the term "electromechanical actuator" it is intended a known assembly adapted to receive electric/electronic signals from a command unit, and provided with suitable kinematic mechanisms for converting the signals into movements/mechanical commands.

According to the invention, the first electromechanical actuator 401 is adapted to operate rotation of the first main rotatable driving pin 24 in such a manner as to make the first main conveyor belt 21 run in a set sliding direction to a given sliding speed.

Control on the first main driving pin is carried out by a suitable control unit 40 provided in the apparatus of the invention, to be described in the following.

The apparatus according to the first embodiment of the invention further comprises a first secondary transport unit 50 mounted on the support structure 30 too and positioned downstream of the first main transport unit 20.

The first secondary transport unit 50 comprises a first secondary conveyor belt 51.

According to the invention, the first secondary conveyor belt 51 is adapted to receive the meat slices 11 from the first main conveyor belt 20.

In particular, the first secondary conveyor belt 51 is adapted to receive meat slices 11 from the first final head 23 of the first main conveyor belt 21; to this aim, the first final head 23 is inclined so as to facilitate unloading of the slices onto the first secondary conveyor belt 51.

The first secondary conveyor belt 51 is also adapted to run in the advancing direction A-A' to take the meat slices 11 to a laying unit for arrangement in trays. In other words, the first secondary conveyor belt 51 is adapted to run in the advancing direction A-A' to carry the meat slices 11 to trays 390.

This secondary belt has a first end close to the first main conveyor belt 21 and a second end close to the packaging station.

Preferably, this first secondary belt is such inclined that it has the first end to a lower height than the second end.

The first secondary conveyor belt 51 is further disposed preferably below the first main conveyor belt 20.

Referring particularly to FIG. 2, the first secondary transport unit 50 according to the invention comprises a secondary rotatable driving pin 35, at the upstream end of the second initial head 52.

Fitted on this pin is a roller to which the first secondary conveyor belt 51, in particular the second initial head 52, adheres.

The secondary driving pin 35 acts as a motion conductor and transmits a rotary motion to the first secondary conveyor belt 51 to enable it to move forward.

The first secondary transport unit 50 comprises a secondary rotatable driven pin 37, at the downstream end of the second final head 53.

Preferably, fitted on the secondary driven pin 37 is a roller to which the first secondary conveyor belt 51, in particular the second final head 53, adheres.

Due to the action of the secondary driven pin 37, this roller acts as a driven roller enabling the first secondary conveyor belt 51 to rotate based on the movement imparted by the secondary rotatable driving pin 35.

Control on the sliding width and speed of the first secondary conveyor belt 51 is carried out by a suitable control unit 40 provided in the apparatus of the invention, to be described in the following.

The first secondary transport unit 50, according to the invention comprises a rotatable adjustment pin 34 jutting out of the support structure 30, in a direction perpendicular to the sliding plane of the first secondary conveyor belt 51.

The adjustment pin 34 is constrained in rotation to the support structure at the downstream end of the second initial head 52 that is coincident with the upstream end of the second final head 53.

The apparatus of the invention comprises a fifth electromechanical actuator 405 (FIGS. 3a and 7) adapted to operate rotation of the adjustment pin 34.

Figure 8:
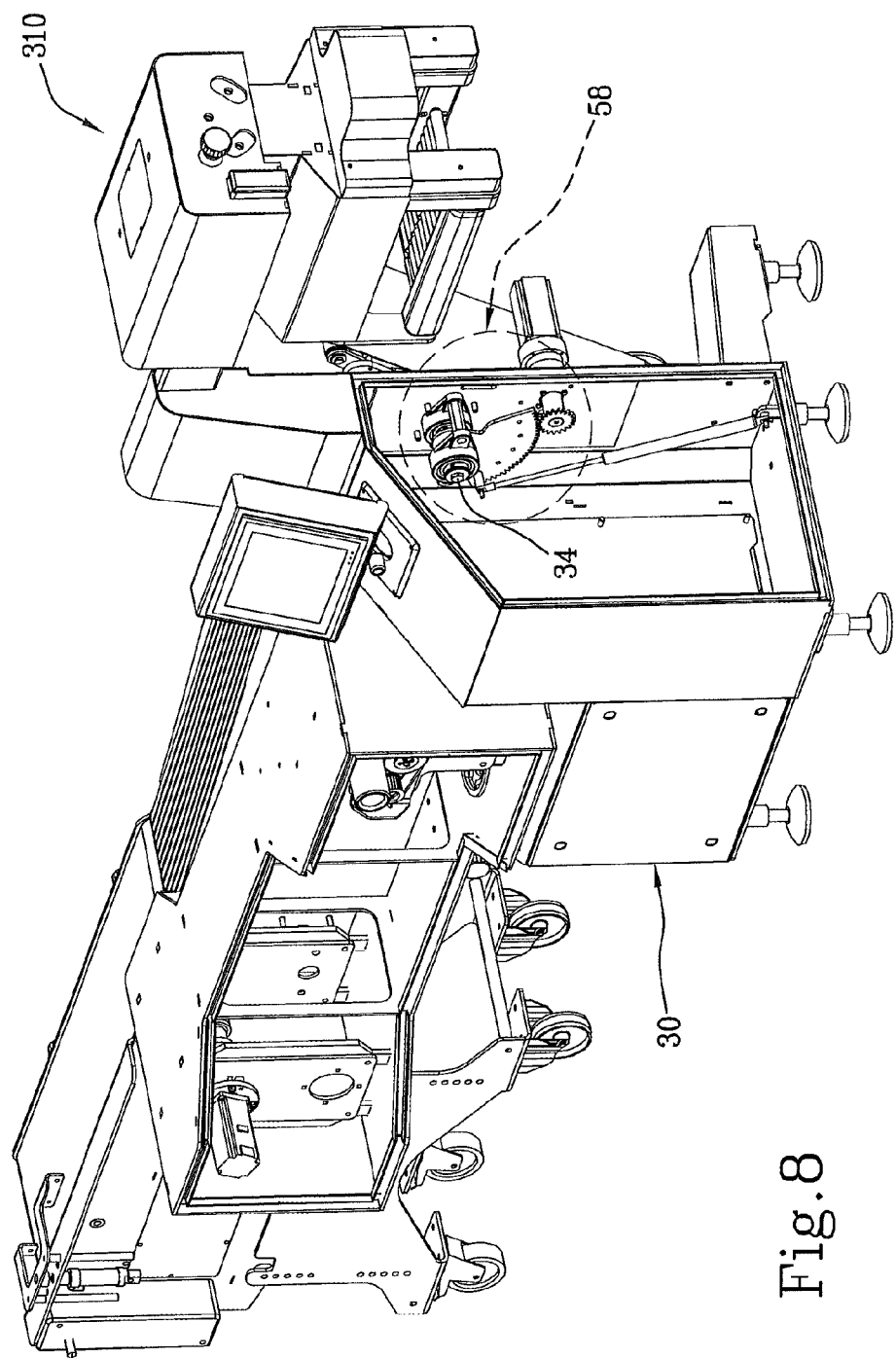
FIG. 8 is a side view of a component of the apparatus according to both embodiments of the invention.
Figure 8A:
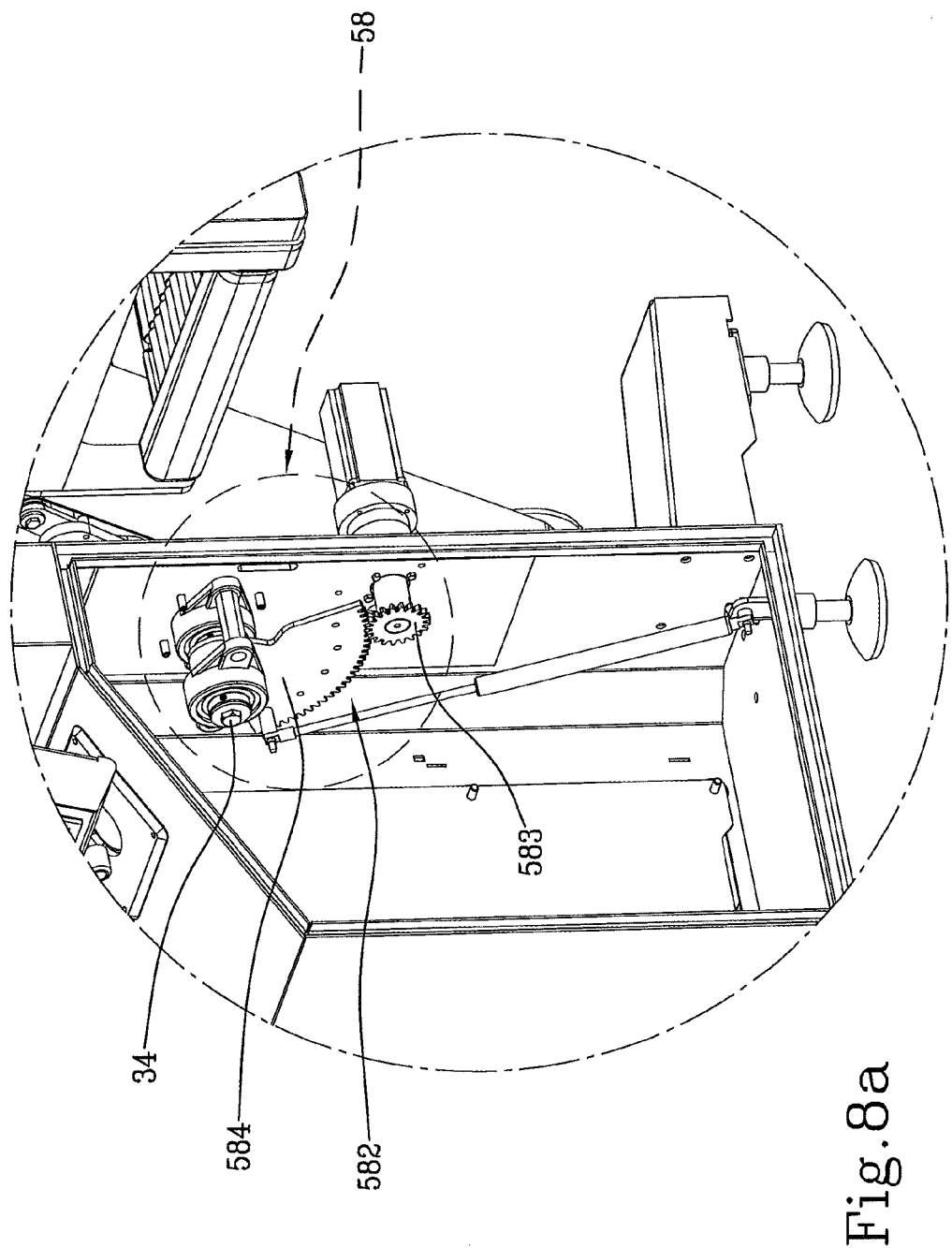

The fifth electromechanical actuator 405 comprises an elevator assembly 58 represented in the apparatus as a whole in FIG. 8 and in greater detail in FIG. 8a.

Referring particularly to these figures, the elevator assembly 58 comprises:
- a servomotor 581 adapted to generate a rotary motion of transmission members 582;
- the adjustment pin 34 transmitting the rotary motion to the secondary transport unit;
- a cam 36 associated with the adjustment pin 34.

The transmission members 582 comprise a toothed wheel 583 rotatably associated with the servomotor 581. This toothed wheel engages the corresponding toothing of a toothed arch 584 centred on the adjustment pin 34.

Therefore, the action of servomotor 581 causes rotation of the adjustment pin 34 that is transmitted to cam 36. Rotation of cam 36 in turn causes raising/lowering of the height of the secondary conveyor belt 51 in the vicinity of the main conveyor belt 21.

The elevator assembly 58 is therefore adapted to adjust the difference in height between the first main conveyor belt 21 and the first secondary conveyor belt 51.

In particular, the elevator assembly 58 is adapted to adjust this difference in height to an optimal value for extending each meat slice 11 coming from the main belt 20 and stacking meat slices 11, avoiding an excessive difference in height or lack of a minimum distance so as to enable movements of the individual or stacked slices 11 on the secondary belt.

Control on the elevator assembly is performed by a suitable control unit 40, provided in the apparatus of the invention, to be described in the following.

The apparatus of the invention comprises a seventh electromechanical actuator 407 (FIGS. 3a and 7) adapted to vary the distance in height between the first belt 21, 121, in particular head 23, 123, and the second belt 51, 151.

The seventh electromechanical actuator 407 comprises an inclination assembly 68, 168.

In particular, the inclination assembly 68, 168 is adapted to adjust this difference in height to an optimal value for extending each meat slice 11 coming from the main belt 20 and stacking meat slices 11, avoiding an excessive difference in height or lack of a minimum distance so as to enable movements of the individual or stacked slices 11 on the secondary belt. Control on the inclination assembly 68, 168 is performed by a suitable control unit 40, provided in the apparatus of the invention, to be described in the following.

A second embodiment of the invention will be now described with general reference to FIGS. 4 to 8.

In the specification of this particular embodiment, the features that make it different from the first embodiment will be underlined and the description of the details in common will be omitted.

The apparatus comprises a second main transport unit 91, for transport of sliced foods 11, in particular meat slices, mounted on the support structure 30.

Preferably, the second main transport unit 91 is adapted to transport meat slices 11 coming from a slicing station, until a second secondary transport unit 150.

Figure 5:
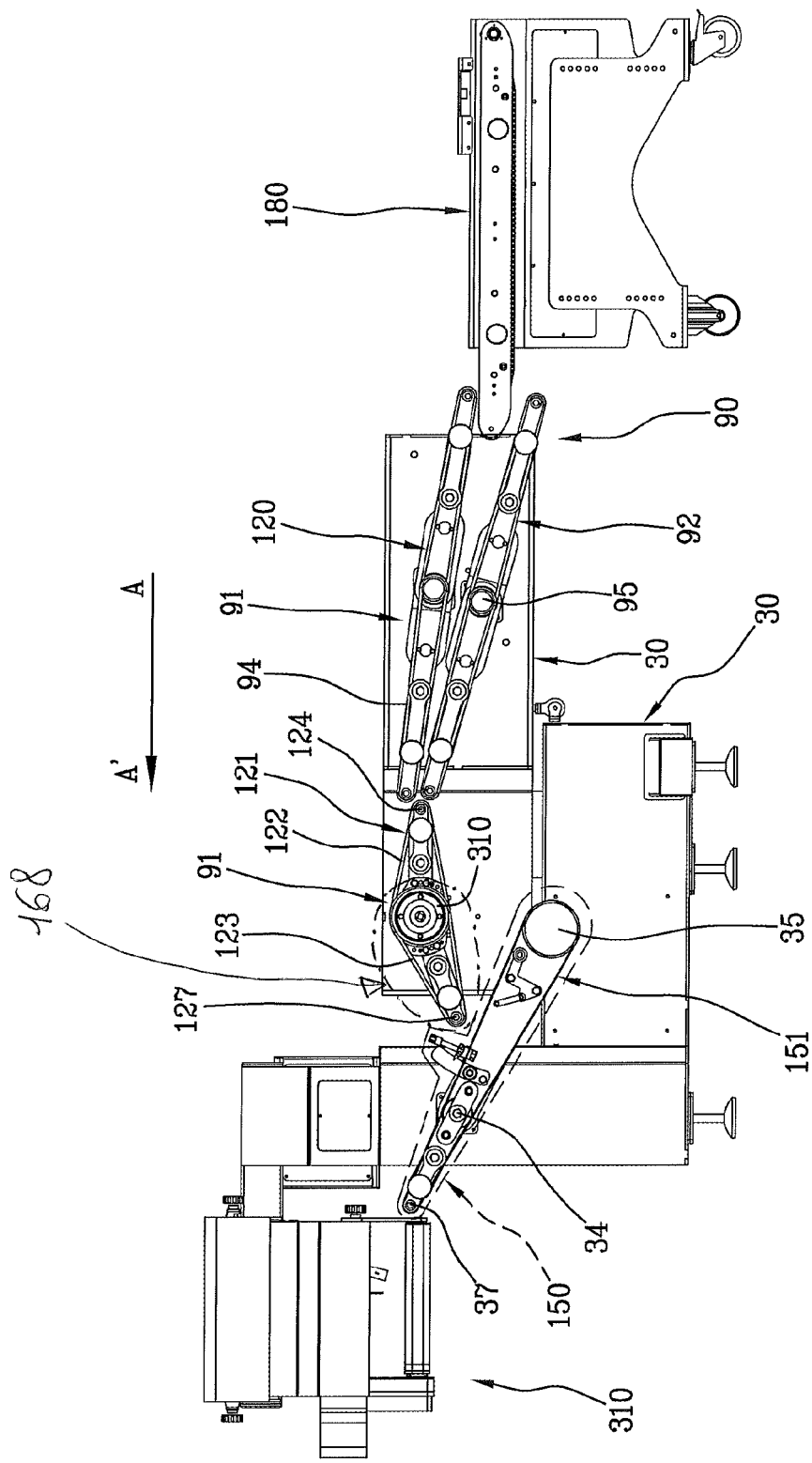
FIG. 5 is a side view of the apparatus in FIGS. 4a, 4b.

Preferably, the meat slices 11 coming out of the slicing station reach the second main transport unit 91 through a second feeding station 180 shown in FIG. 5 in chain line.

The second feeding station 180 is disposed upstream of the second main transport unit 91 relative to an advancing direction A-A' of the meat slices 11, denoted by an arrow in FIG. 5.

With particular reference to FIG. 5, the second main transport unit 91 comprises a second main conveyor belt 121, for transport of the sliced foods 11.

The second main conveyor belt 121 is adapted to run along a sliding plane in the advancing direction A-A' for carrying the meat slices 11.

According to the invention, the second main conveyor belt 121 is also adapted to translate in a transverse direction B-B relative to the advancing direction A-A', along the sliding plane.

Figure 6:
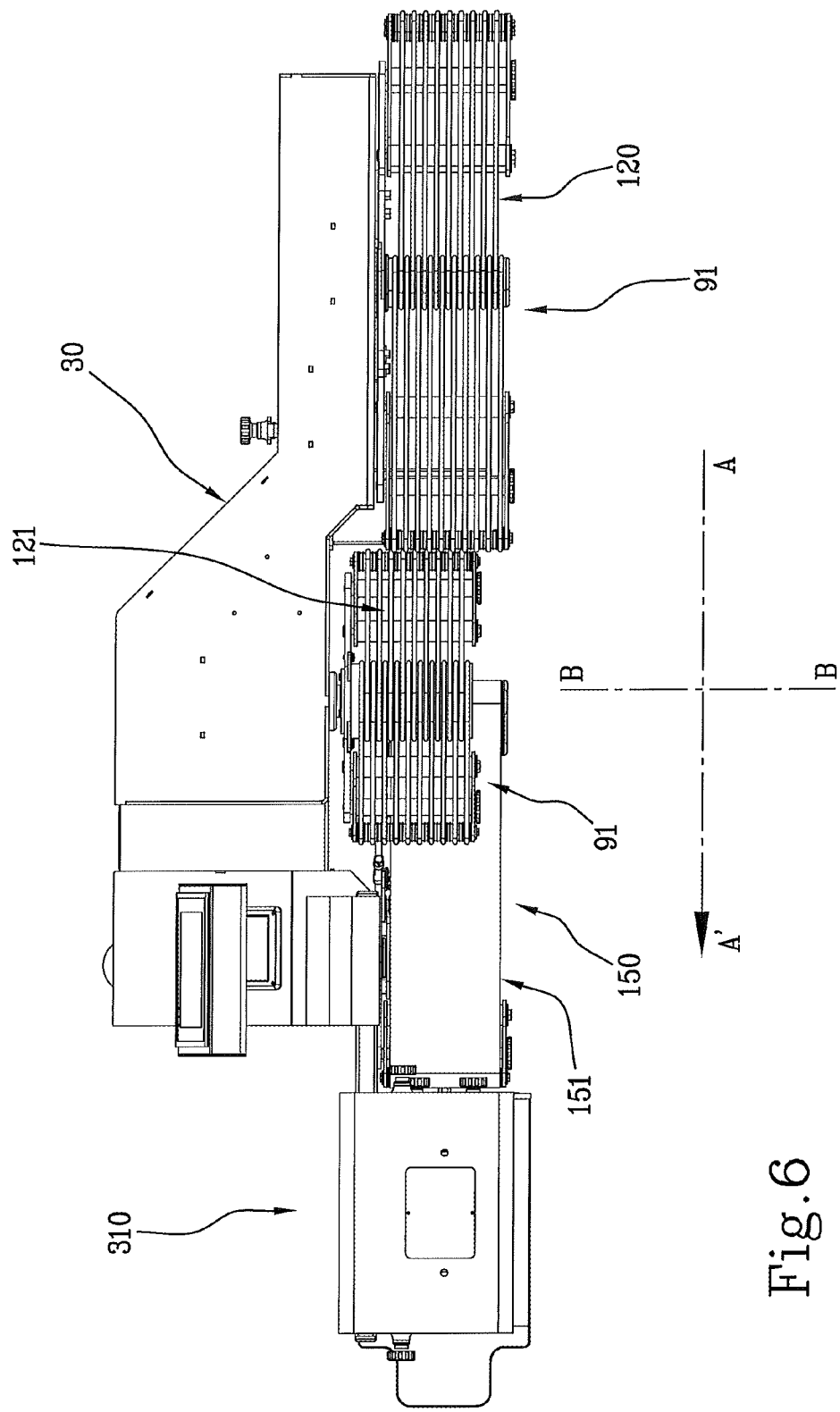
FIG. 6 is a plan view of the apparatus in FIGS. 4a, 4b.
Figure 7:
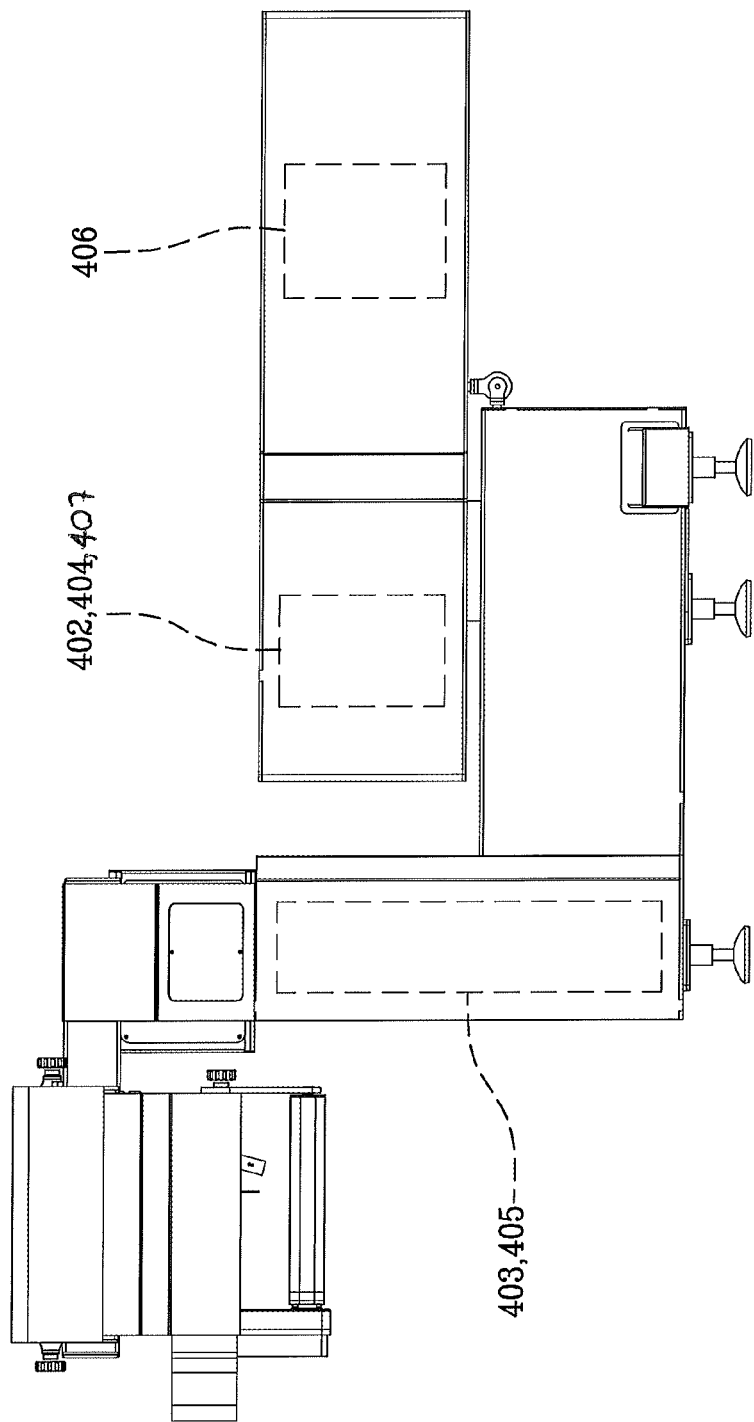
FIG. 7 is a side view of the apparatus in FIGS. 4a, 4b in which some inner components of the apparatus itself are shown (in dotted line)

The advancing and transverse-translation directions, A-A' and B-B respectively, are jointly shown in FIG. 6.

The second main transport unit 91 further comprises a third main conveyor belt 120, for transport of the sliced foods 11, mounted on the support structure 30 upstream of the second belt 121.

The third main conveyor belt 120 is adapted to carry the meat slices 11 from the second feeding station 180 to the second main conveyor belt 121.

Preferably, the second feeding station 180 can be inclined in such a manner as to enable easy feeding of the meat slices 11 to the second main conveyor belt 121.

Preferably, the second main conveyor belt 121 comprises a third initial head 122 and a third final head 123 disposed upstream and downstream respectively, relative to the advancing direction of the meat slices 11.

Both heads are mounted to an inclined position relative to a hypothetical horizontal position and are mechanically constrained in such a position.

The second main transport unit 91 according to the invention comprises a second main driving pin 125 jutting out of the support structure 30, in a direction perpendicular to the sliding plane of the second main conveyor belt 121.

The second main driving pin 125 is constrained in rotation to the support structure, at the downstream end of the third initial head 122 that is coincident with the upstream end of the third final head 123.

The apparatus of the invention comprises a derailleur 126 fitted on the second main driving pin 125.

The apparatus of the invention comprises a second electromechanical actuator 402 adapted to operate rotation of the second main driving pin 125.

The derailleur 126 is adapted to cause translation of the second main conveyor belt 121 along the longitudinal axis of the second main driving pin 125, coincident with the transverse direction B-B.

The apparatus according to the second embodiment of the invention further comprises a storage unit 90, mounted on the support structure 30 and in turn comprising a storage belt 92 for temporarily stocking the sliced foods 11.

The storage belt 92 is adapted to run along at least one sliding plane in an advancing direction A-A' and a moving-back direction A'-A.

The third initial head 122 is adapted to unload the meat slices 11 to different conveyor belts, i.e. to the third secondary conveyor belt 120 or the storage belt 92, depending on the inclination of said belts relative to the lying plane of the third initial head 122.

In other words, the storage belt 92 is adapted to slope in such a manner that it aligns itself with the third initial head 122; in this case, the third initial head 122 enables loading of slices 11 on the storage belt 92.

Loading on the storage belt takes place under one or more of the following situations:
- temporary lack of availability of containers in the packaging station;
- temporary non-operation of the packaging station;
- generic situation of failure of the apparatus;
- specific command of temporary stocking of the slices before packaging.

Figure 4A:
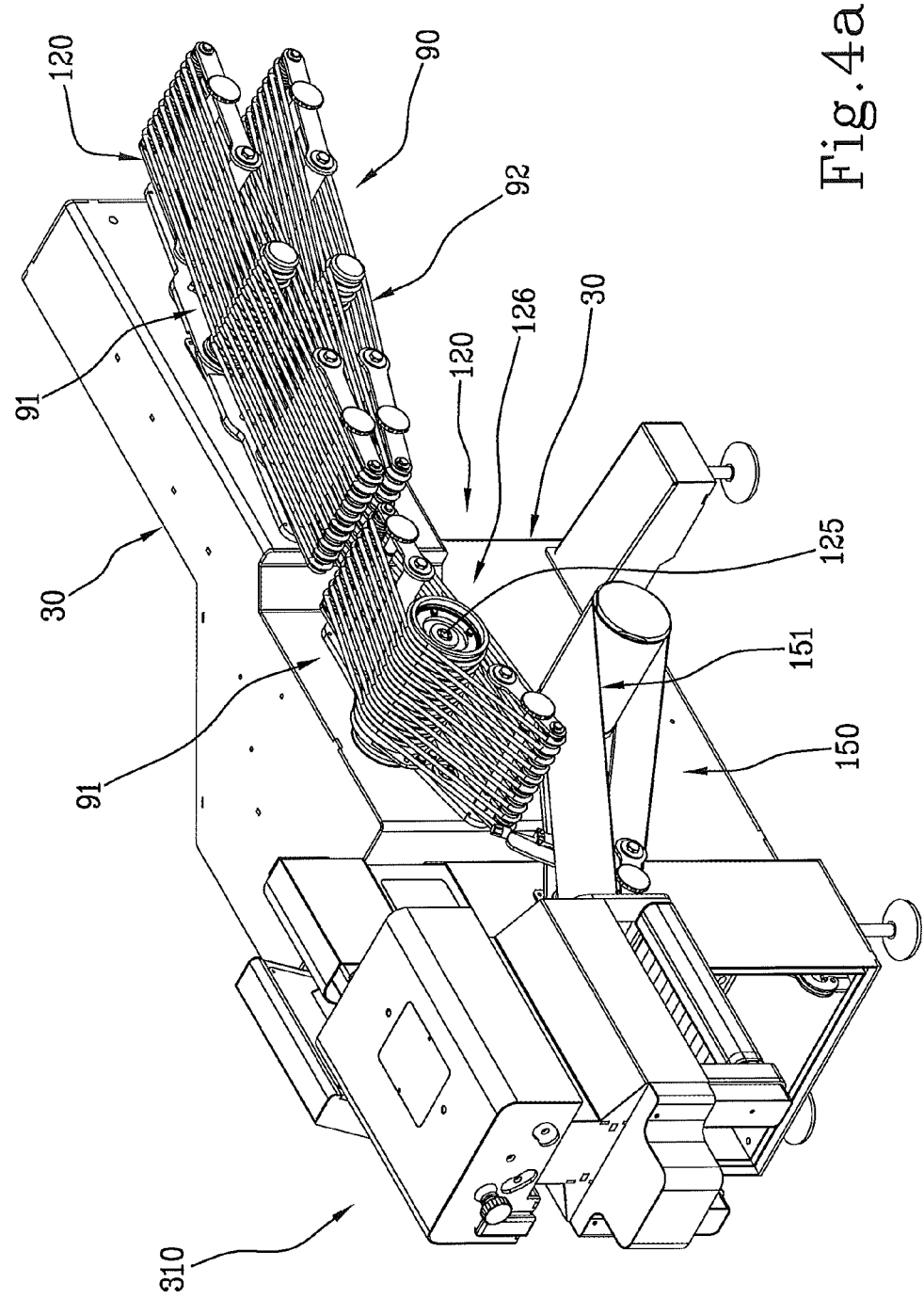

Preferably, as shown in FIGS. 4a, 4b and 5, the main transport 91 and storage 90 units are adapted to receive meat slices 11 in mutual exclusion depending on a mutually exclusive alignment with the third initial head 122.

The apparatus according to the second embodiment of the invention comprises a second secondary transport unit 150 mounted on the support structure 30 as well, and positioned downstream of the second main transport unit 91.

The second secondary transport unit 150 comprises a second secondary conveyor belt 151.

According to the invention, the second secondary conveyor belt 151 is adapted to receive meat slices 11 from the second main conveyor belt 121.

The second main conveyor belt 121, as already said, is sloping in a manner adapted to facilitate unloading of the meat slices 1 onto the second secondary conveyor belt 151.

The second secondary transport unit 150 is comparable to the first secondary transport unit 50 and is provided with a fifth initial head 152 and a fifth final head 153; the other components of the second secondary transport unit 150 are identified in FIGS. 4a, 4b, 5, 6 and 7 by the numerical references of the first secondary transport unit 50.

The apparatus of the invention comprises a third electro-mechanical actuator 403 (FIGS. 3a and 7) adapted to operate rotation of the secondary driving pin 35 in such a manner as to make the second secondary conveyor belt 151 run in a sliding direction to a given sliding width and speed.

Control on these variables is carried out by a suitable control unit 40, provided in the apparatus of the invention, to be described in the following.

Preferably, in both embodiments of the invention the electromechanical actuators comprise a servomotor.

Preferably the servomotor is a brushless servomotor.

The technical effect achieved by use of this servomotor results in quick and accurate commands to the rotatable pins, based on pulses received by the control unit 40.

In particular, use of a servomotor enables the speed of the main conveyor belt 21, 121 to be accurately synchronised with the speed for extending the slice on the secondary conveyor belt 51, 151.

As previously mentioned, the apparatus according to both embodiments of the invention comprises a control unit 40.

The control unit 40 is adapted to operate the electromechanical actuators responsible for the independent or combined movements of the conveyor belts.

Generally, it should be noted that in the present context and in the following claims, the control unit 40 is shown as divided into distinct functional modules for the only purpose of describing the functional qualities of same in a clear and full manner.

This unit can consist of a single electronic device, suitably programmed for performing the described functions, and the different modules can correspond to hardware and/or routine software components being part of the programmed device.

Alternatively or in addition, these functions can be performed by a plurality of electronic devices on which the aforesaid functional modules can be distributed.

The control unit can further take advantage of one or more processors for carrying out the instructions contained in the memory or storage modules.

Said functional modules can further be distributed on different computers, locally or remotely, based on the architecture of the network in which they reside.

In particular, the control unit 40 is configured for determining one or more of:
a) an advancing direction of the main belts 21, 121, 120;
b) a translation direction and width of the main belts 21, 121;
c) an advancing/moving back direction of the secondary belts 51, 151;
d) an advancing/moving back width of the secondary belts 51, 151;
e) a displacement speed of the secondary belts (51, 151);
f) an inclination of one or more heads of the conveyor belts (21, 121, 51, 151), in such a manner that the meat slices 11 are laid in the containers 390 according to one of the following arrangements (FIG. 10):
- on a single row parallel to the advancing direction and partly overlapped (Case (A));

For carrying into practice such an arrangement, the control unit 40 is adapted to determine the parameters expressed above in a), c), d), e) and possibly f).
- on two rows parallel to the advancing direction and partly overlapped, each on its own row (case (B));
- on two rows parallel to the advancing direction, partly overlapped each on its own row and with a third row parallel to the advancing direction that is positioned partly overlapped on the first two rows (case (C));
- on two rows parallel to the advancing direction, partly overlapped each on its own row and partly crossed between the two rows (case (D));
- on two rows parallel to the advancing direction, partly overlapped each on its own row, partly crossed between the two rows and with a third row parallel to the advancing direction that is positioned partly overlapped on the two first rows (case (E)).

To put into practice the arrangements shown in cases B to E, the control unit 40 is adapted to determine the parameters expressed above in a), b), c), d), e) and possibly f).

The apparatus of the invention further comprises a user interface 60 through which an operator can select the arrangement of slices 11.

In other words, the user interface 60 shows the possible arrangements of slices 11 in trays 390, as shown in FIG. 10.

Selection of the arrangement can take place through pressure on the display (touch screen) or equivalent modalities.

The user interface 60 is configured for enabling setting of at least one arrangement parameter P1, P2 representative of an arrangement of the sliced foods 11 in trays 390.

In particular, the first parameter P1 is representative of one of the arrangements, denoted by letters A to E, shown in FIG. 10.

Selection of the arrangements is preferably carried out at least based on one or more of the following characteristic parameters:
useful sizes of the tray;
sizes of the slice to be put into the tray;
slice thickness;
amount of slices to be put into the trays.

Preferably, the selection can be carried out by an operator.

Alternatively or for help, the selection can be carried out by an operator assisted by an automated system.

The control unit 40 is therefore configured for receiving at least one arrangement parameter P1, P2 from the user interface 60.

In addition, the control unit 40 is configured for generating at least one adjustment signal S1, S2, S3, S4, S5 for carrying out arrangement into containers 390 as a function of the selection done through the at least one arrangement parameter P1, P2.

The adjustment signal S1, S2, S3, S4, S5 acts on the transport station, i.e. on one or more of the main and secondary transport or storage units.

The control unit 40 comprises a first synchronisation module 41 configured for generating a first adjustment signal S1.

The first adjustment signal S1 is adapted to synchronise the sliding speeds of the main 21, 91 and secondary 51, 151 conveyor belts.

The first adjustment signal S1 is a function of the selected first arrangement parameter P1.

In other words, the mathematical relation linking the adjustment signal S1 and the arrangement parameter P1 is: S1=f(P1).

Based on selection of how the slices 11 are arranged in the containers 390, the sliding speed of the main and secondary belts is set in such a manner that passage of the slices from the main belt to the secondary belt takes place correctly.

The adjustment signal S1 is therefore a synchronisation signal.

The technical effect thus achieved is to avoid folding upon themselves and/or rolling up of the slices when moving from the main belt 21, 121 to the secondary belt 51, 151.

The technical effect is achieved by a first 401, a second 402 and a third 403 electromechanical actuator, said actuators being adapted to receive the first adjustment signal S1 from the control unit 40.

In the first embodiment of the invention, the first 401 and third 403 electromechanical actuators are further adapted to synchronise the sliding speeds of the first main 21 and secondary 51 conveyor belts by setting the same peripheral speed, adjusting the rotation speed of the first main driving pin 24 and of the adjustment pin 34, as a function of the first adjustment signal S1.

Adjustment of the speed of the adjustment pin 34 determines the rotation speed of the secondary driving pin 35.

In the second embodiment of the invention, the first 401 and second 402 electromechanical actuators are further adapted to synchronise the sliding speeds of the second main 121 and secondary 151 conveyor belts, by setting the same peripheral speed, adjusting the rotation speed of the second main driving pin 125 and the adjustment pin 34, as a function of the first adjustment signal S1.

Adjustment of the speed of the adjustment pin 34 determines the rotation speed of the secondary driving pin 35.

The control unit 40 further comprises a first positioning module 42 configured for generating a second adjustment signal S2.

The second adjustment signal S2 is adapted to determine a periodic displacement of the secondary conveyor belt 51, 151.

The second adjustment signal S2 is a function of the selected first arrangement parameter P1.

In other words, the mathematical relation linking the adjustment signal S2 and the arrangement parameter P1 is S2=f(P1).

Differently said, based on selection of the arrangement of slices 11 in containers 390, when each meat slice 11 reaches the secondary conveyor belt 51, 151, the first positioning module 42 operates movement of belt 51, 151 in the sliding direction, to extend the slice on the belt.

As the arrangements provided through the interface 60 contemplate that the following meat slice 1 to be put on the secondary belt 51, 151 has to partly overlap the first one, the first positioning module 42 operates movement of belt 51, 151 in the direction opposite to the advancing direction to prepare the already extended slice to receive the subsequent slice in partial overlapping.

Overlapping can take place transversely or longitudinally relative to the first slide laid on the secondary belt.

Signal S2 is therefore a movement signal.

The technical effect thus achieved is the correct longitudinal or transverse overlapping of the slices on the secondary conveyor belt.

This technical effect is achieved by a third electromechanical actuator 403 (FIGS. 3a and 7) adapted to receive the second adjustment signal S2 from the control unit 40.

According to the invention, the third electromechanical actuator 403 is further adapted to determine the periodic displacement of the secondary conveyor belt 51, 151 obtained by setting an alternated advancing and moving-back sliding frequency and width thereof, acting on rotation of the first secondary driving pin 35.

Rotation of the secondary driving pin is preferably determined by rotation of the adjustment pin 34.

The control unit 40 comprises a second positioning module 43 configured for generating a third adjustment signal S3.

The third adjustment signal S3 is adapted to determine a translation degree in the transverse direction B-B of said main conveyor belt 21, 121.

The third adjustment signal S3 is a function of the selected first arrangement parameter P1.

In other words, the mathematical relation linking the adjustment signal S3 and the arrangement parameter P1 is: S3=f(P1).

In other words, based on selection of the arrangement of slices 11 in containers 390, when said slices reach the main belt 21, 121, a translation in the transverse direction B-B of the main conveyor belt 21, 121, according to a predetermined extent is carried out.

The adjustment signal S3 is therefore a movement signal.

The technical effect achieved is the transverse alignment of the slices on the main belt 21, 121.

This technical effect is achieved by a fourth electromechanical actuator 404 (FIGS. 3a and 7) adapted to receive the third adjustment signal S3 from the control unit 40.

In the first embodiment of the invention, the fourth electromechanical actuator 404 is adapted to determine the translation extent in the transverse direction B-B of the first main conveyor belt 21 by setting a translation extent of the derailleur 26.

In the second embodiment of the invention, the fourth electromechanical actuator 404 is adapted to determine the translation extent in the transverse direction B-B of the second main conveyor belt 121 by setting a translation extent of the derailleur 126.

In other words, the fourth electromechanical actuator 404 determines a rotation of a worm screw on which a bushing is assembled, said bushing moving the structure of the derailleur by a translational motion.

The control unit 40 comprises a third positioning module 44 configured for generating a fourth adjustment signal S4.

The adjustment signal S4 is adapted to determine a raising extent of an average height of the secondary conveyor belt 51, 151.

The fourth adjustment signal S4 is a function of the selected first arrangement parameter P1.

In other words, the mathematical relation linking the adjustment signal S4 and the arrangement parameter P1 is: S4=f(P1).

Differently said, based on selection of the arrangement of slices 11 in containers 390, when the slices come onto the secondary belt 51, 151, raising of an average height of the secondary conveyor belt is carried out in such a manner that there is not too much a difference in height between the main belt and secondary belt or there is the minimum distance to enable movements of the meat slices.

The fourth adjustment signal S4 is therefore a movement signal.

The technical effect achieved is the variation of the difference in height between the first belt 21, 121 and the second belt 51, 151.

This technical effect is achieved by a fifth electromechanical actuator 405 (FIGS. 3a and 7) adapted to receive the fourth adjustment signal S4 from the control unit 40.

According to the invention, the fifth electromechanical actuator 405 is further adapted to determine the raising extent of an average height of the secondary conveyor belt 51, 151, through the action of the elevator assembly 58.

The elevator assembly 58 is adapted to raise or lower the first secondary belt 51 at each received slice, for adjusting the difference in height from the first main belt 21 (controlled variable) as a function of overlapping of the slices, as established through the interface 60.

Advantageously, according to the invention, the action of the elevator assembly 58 helps in optimising extending and overlapping of the meat slices avoiding rolling-ups that would give rise to problems during the packaging step.

In other words, the third positioning module 44 operates inclination of the secondary conveyor belt 51, 151 by acting on the elevator assembly 58 to maintain the difference in height between the secondary 51, 151 and main 21, 121 belts.

Differently said, the third positioning module 44 adjusts the difference in height as a function of one or more of the following characteristic parameters:
thickness of the slice to be put in the tray;
type of meat to be put in the tray;
arrangement of the slices established through the interface 60.

Preferably, the thickness of the meat slice is 8 mm.

On passage of a first slice to be laid into a tray from the main belt 21, 121 to the secondary belt 51, 151, the difference in height is about 1 cm.

At the end of preparation of a packet of slices to be put in a tray, the maximum difference in height is 7 cm.

The control unit 40 comprises a sixth positioning module 46 configured for generating a sixth adjustment signal S6.

The sixth adjustment signal S6 is adapted to determine a variation in the inclination of the main belt 21, 121.

In particular, the sixth adjustment signal S6 is adapted to determine a variation in the inclination of the final head 23, 123.

The sixth adjustment signal S6 is a function of the selected first arrangement parameter P1.

In other words, the mathematical relation linking the adjustment signal S6 and the arrangement parameter P1 is: S6=f(P1).

Differently said, based on selection of the arrangement of slices 11 in containers 390, when the slices reach the main belt 21, 121, a variation in the inclination of the main belt is carried out in such a manner that too much a difference in height does not exist between the main belt and secondary belt or there is the minimum distance for carrying out the movements of the meat slices.

The sixth adjustment signal S6 is therefore a movement signal.

The technical effect achieved is the variation in the difference in height between the first belt 21, 121, in particular the head 23, 123, and the second belt 51, 151.

This technical effect is achieved by a seventh electromechanical actuator 407 (FIGS. 3a and 7) adapted to receive the sixth adjustment signal S6 from the control unit 40.

According to the invention, the seventh electromechanical actuator 407 is adapted to move an inclination assembly 68, 168 (FIGS. 2a and 5) adjusting the inclination of head 23, 123 relative to the secondary conveyor belt 51, 151.

The inclination assembly 168 is adapted to raise or lower the first head 23 (or the third head 123) at each received slice, for adjusting the difference in height from the secondary conveyor belt 51, 151 (controlled variable), as a function of overlapping of the slices established through the interface 60.

Advantageously, according to the invention, the action of the inclination assembly 68, 168 helps in optimising extending and overlapping of meat slices, avoiding rolling-ups that would give rise to problems in the packaging step.

In other words, the sixth positioning module 46 controls the inclination of the main conveyor belt 21, 121, in particular of the head 23, 123, by acting on the inclination assembly 68, 168 for maintaining the difference in height between the secondary belt 51, 151 and the main belt 21, 121.

Differently said, the sixth positioning module 46 adjusts the difference in height as a function of one or more of the following characteristic parameters:
thickness of the slice to be put in a tray;
type of meat to be put in a tray;
arrangement of the slices as established through the interface 60.

Preferably, the thickness of the meat slice is 8 mm.

On passage of a first slice to be laid into a tray from the main belt 21, 121 to the secondary belt 51, 151, the difference in height is about 1 cm.

At the end of preparation of a packet of slices to be put in a tray, the maximum difference in height is 7 cm.

According to the invention, adjustment of the difference in height between the main belt 21 121 and the secondary belt 51, 151, as a function of one or more characteristic parameters representing the thickness of the slice to be put in a tray, the type of meat to be put in a tray and the arrangement of the slices as established through the interface 60, can be carried out by the third positioning module 44 in combination with the sixth positioning module 46 or, alternatively, by one alone of the two modules.

In other words, the variation in the difference in height can be due to the variation of inclination of one alone of the two belts, maintaining the other belt stationary, or can be due to the combined variation of inclination of the two belts.

Generally, the fourth adjustment signal S4 and sixth adjustment signal S6 are generated by the control unit 40 for varying a relative inclination between the main belt 21, 121 and the secondary belt 51, 151.

In particular, the fourth adjustment signal S4 and sixth adjustment signal S6 are generated by the control unit 40 for varying a relative inclination between the head 23, 123 and the secondary belt 51, 151.

This enables extending and overlapping of slices on passage between said belts to be optimised, avoiding rolling-ups that would create problems in the subsequent arrangement of the slices inside the containers 390.

The control unit 40 comprises a second synchronisation module 45 configured for generating a fifth adjustment signal S5.

The fifth adjustment signal 55 is adapted to synchronise the sliding speeds of the storage belt 92 and of the second main conveyor belt 121.

The fourth adjustment signal S3 is a function of the selected second arrangement parameter P2.

In other words, the mathematical relation linking the adjustment signal S5 and the arrangement parameter P2 is: S5=f(P2).

In particular, the second arrangement parameter P2 is set based on the aesthetic/qualitative features of the sliced foods.

In other words, based on the external quality of the meat slice 11, the latter can be temporarily stored waiting for being positioned at a pre-established position in the tray 390, under the other slices for example.

If, for instance, slice 1 is not externally fine or is too small, it is diverted onto the storage belt 92 so that it will be laid under the other slices in tray 390.

The second synchronisation module 45 is further configured for synchronising the sliding speed of the storage belt 92 with that of the second main conveyor belt 121, as a function of the received fifth adjustment signal S5.

The technical effect achieved is to prevent the slices from rolling up and folding upon themselves on passage from the second main conveyor belt 121 to the storage belt 92.

This technical effect is achieved by a sixth electromechanical actuator 406 (FIG. 7) adapted to receive the fifth adjustment signal S5 from the control unit 40.

According to the invention, the sixth electromechanical actuator 406 is further adapted to set a rotation speed of the auxiliary driving pin 95, as a function of the fifth adjustment signal S5 in such a manner as to synchronise the peripheral sliding speeds of said storage belt 92 and of the second main conveyor belt 12.

According to the invention, the sixth electromechanical actuator 406 is adapted to synchronise the sliding speed of the storage belt 92 with the speed of the second main conveyor belt 121, by setting a rotation speed of the auxiliary driving pin 95 so that it is substantially comparable with that of the second main driving pin 125.

According to both embodiments, the apparatus of the invention comprises a laying unit 310 for arrangement into containers 390, in particular trays, that is disposed downstream of the secondary transport unit 50, 150 and adapted to receive the sliced foods 11 therefrom, in particular slices of meat disposed on the basis of the selected setting by means of the interface 60.

The laying unit for arrangement in trays 310, also referred to as handling device, described in detail with reference to FIGS. 11-23, is adapted to:
  receive the sliced foods 11 disposed on the basis of the selected setting by means of the interface 60;
  detecting the presence and correct position of the sliced foods 11;
  laying the sliced foods 11 inside containers 390 through downward opening of a supporting base 400 (FIG. 12) for the sliced foods 11.

The supporting base 400 is adapted to ensure support, sliding and unloading of the sliced foods 11.

In the unloading step, the sliced foods 11 fall under gravity into a packaging station in which the containers 390 are provided.

The technical effect achieved is the careful laying of the meat slices 11 inside the respective containers 390. In particular, with reference to FIG. 11, the laying unit 310 is adapted to be associated with the secondary transport unit 50, 150.

In the example shown, two secondary transport units 50, 150 are present, each of them being associated with a respective laying unit 310.

The secondary conveyor belt 51, 151 is such inclined that it moves the sliced foods 11 from a lowered position to a higher position, which higher position is placed at the inlet area of a laying unit 310.

The secondary conveyor belt 51, 151 is adapted to carry the sliced foods 11 in a predetermined manner, based on the arrangement set through the interface 60.

In order to receive the sliced foods 11, the supporting base 400 comprises at least one set of powered rollers 311, 312.

Preferably, the supporting base 400 comprises two opposite sets of powered rollers.

The laying unit 310 comprises a first and a second casing 316, 317 respectively associated with said sets of rollers 311, 312.

Each set of rollers 311, 312 is made up of a plurality of individual rollers 311', 312' parallel to each other.

The individual rollers 311', 312' are placed in cantilevered fashion relative to the respective first and second casings 316, 317.

The first and second casings 316, 317 each comprise transmission members for imposing a rotary motion to each roller 311', 312', around the axis thereof. The transmission members will be better described in the following.

In an operating configuration of the laying unit 310, ends of rollers 311', 312' opposite to those fitted in the first and second casings 316, 317 are almost in contact with each other so as to define a support area for the sliced foods 11 coming from the conveyor belt 51, 151.

Preferably, the first and second casings 316, 317 are mounted on bearings 380, 380' and 381, 381' the function of which will be clarified in the following.

Two elements 320, 321 supporting a cross member 313 are connected to the front end of the first and second casings 316, 317. A rear plate 314 is connected to the rear end of the first and second casings 316, 317.

The front cross member 313 and rear plate 314 are mounted in such a manner as to support a frame 315.

The frame 315 is adapted to carry the laying unit 310 along a horizontal bar.

Frame 315 is further adapted to support a small frame 330 carrying a first photoelectric cell 331.

The small frame 330 can be moved and placed to a different position so as to adapt the position of the first photoelectric cell 331 to different types and sizes of sliced foods 11.

Displacement of the small frame 330 is obtained by actuation of two knobs 332, 333 acting on respective slots 334, 335.

Figure 11:
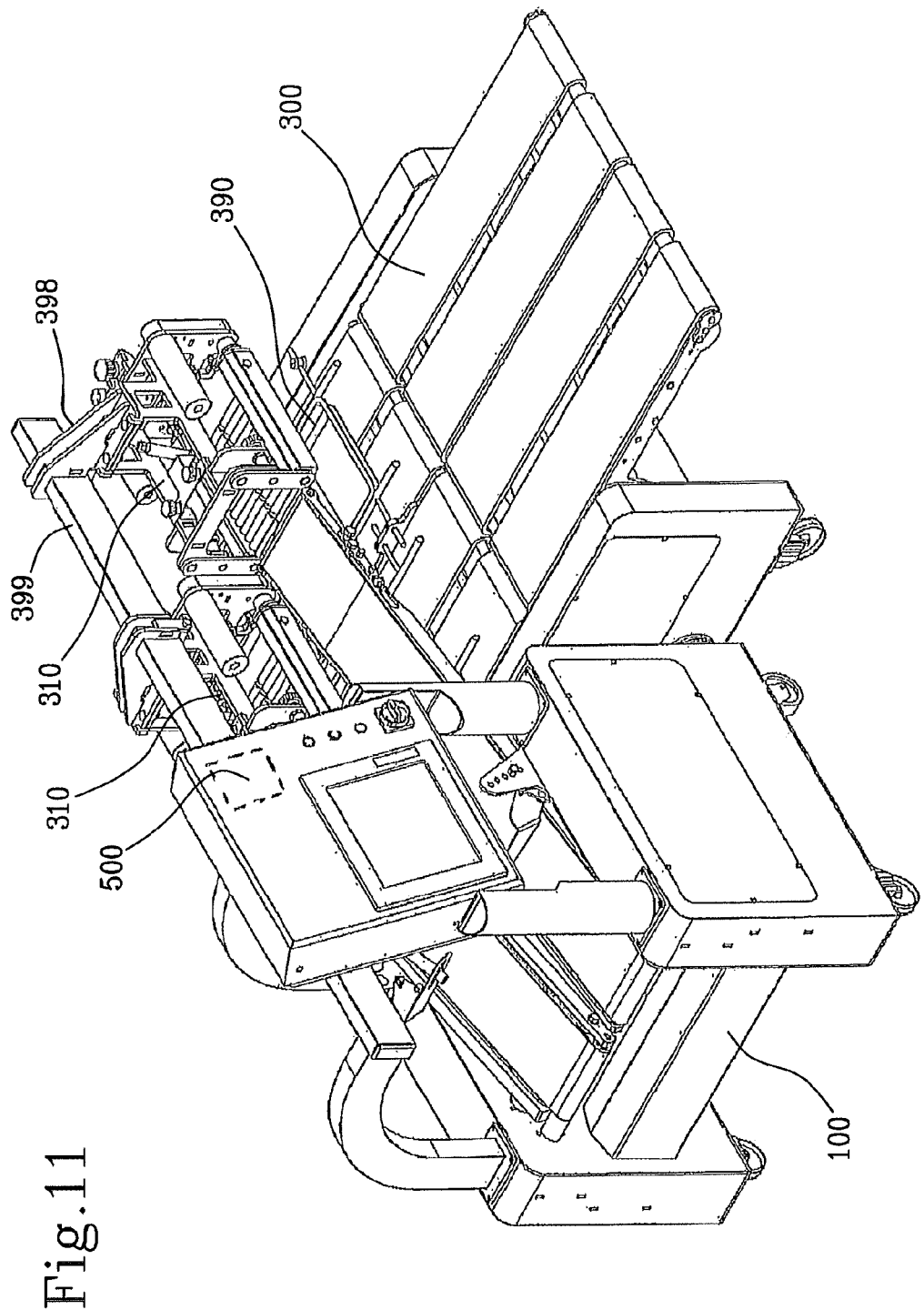
FIG. 11 is an axonometric view of a laying unit for arrangement in trays.

Frame 315 houses a hook 398 used for hanging the whole laying unit 310 on a bar 399 placed above the path of the secondary conveyor belt 51, 151 and above a packaging conveyor belt 300 (FIG. 11).

Fastened in cantilevered fashion to the rear plate 314 are two electric motors 348, 349, contained inside a third and a fourth casing 340, 341 respectively; said motors drive the rollers in rotation around their own axes.

In particular, the two electric motors 348, 349 first drive motion-transmitting members contained inside the respective fifth and sixth casings 342, 343.

Figure 9:
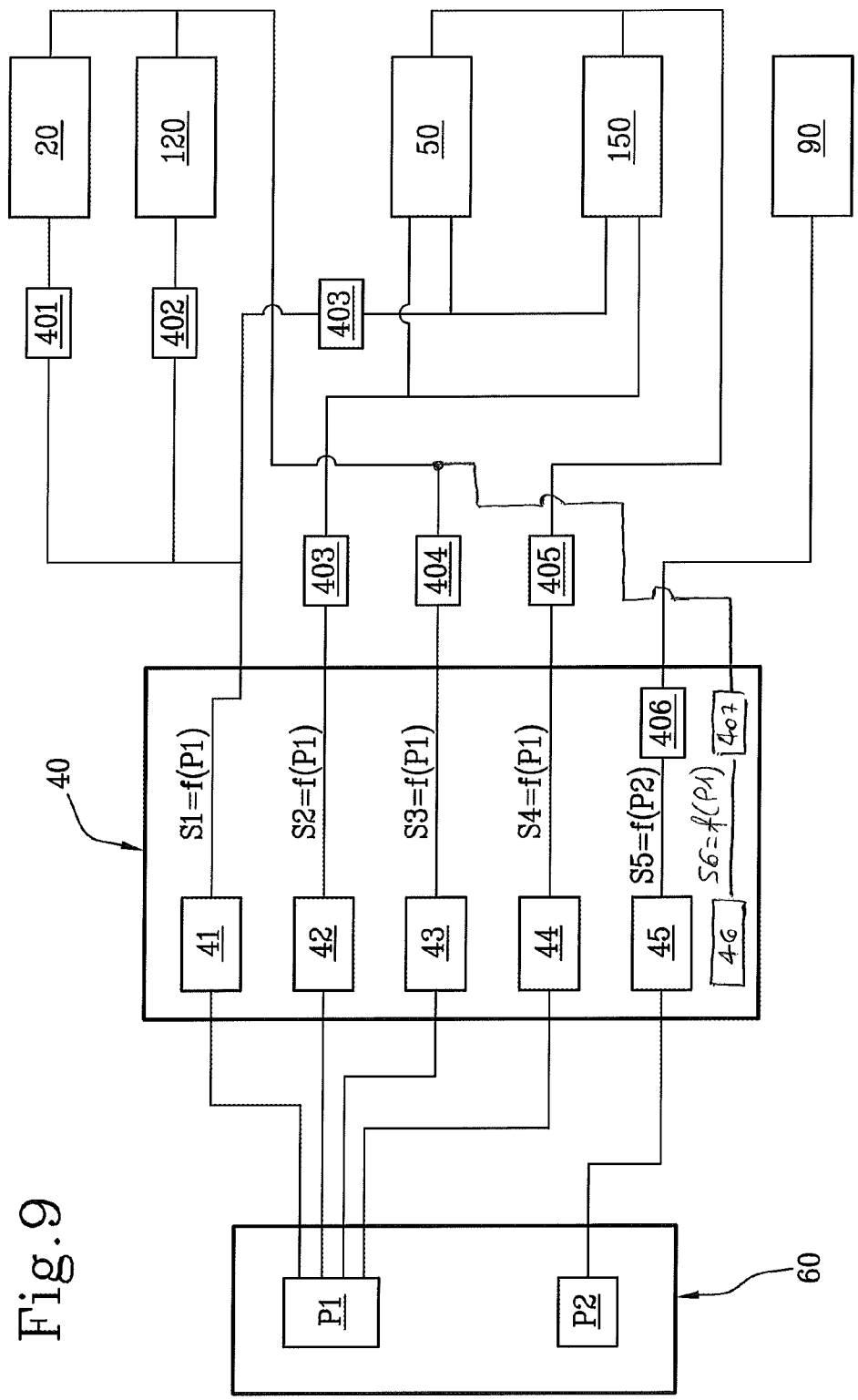
FIG. 9 is a block diagram of a control unit included in the apparatus of the invention.

For depicting the mechanical connection between the electric motor 348 and the respective rollers 311' of the set of rollers 311, reference is now made to FIG. 9, pointing out that an analogous mechanical connection is provided between the electric motor 349 and rollers 312' of the opposite set 312.

Section A-A of FIG. 9 shows that inside the fifth casing 342 provision is made for a chain 350 for transmitting the rotation of a shaft 351 of the electric motor 348 to a pinion 352.

Inside the first casing 316, on the contrary, a chain 356 is present that through respective toothed wheels 357' acts on shafts 357 each of which belongs to the individual rollers 311' of the set of rollers 311.

Pinion 352 is provided with a conical gear 353 suitable for engagement with a corresponding conical gear 354 to drive a rotation pin 355 in rotation.

Rotation of the rotation pin 355 sets chain 356 in motion inside the first casing 316 that, in turn, sets in rotation the individual rollers 311' on the respective axes.

Likewise, similar mechanisms not shown for the sake of simplicity, are able to transmit motion from the electric motor 349 to the individual rollers 312' of the opposite set of rollers 312.

Figure 12:
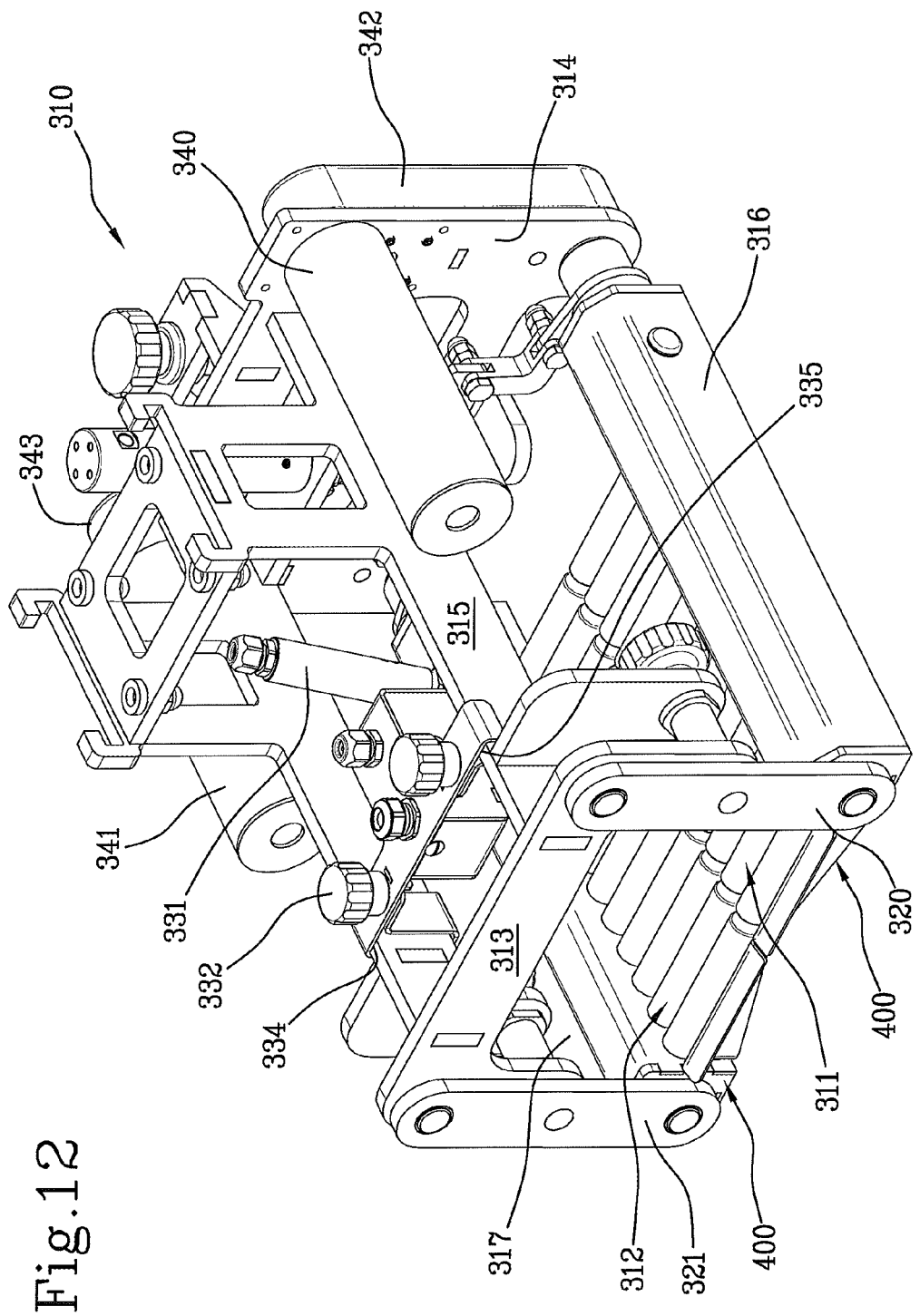
FIG. 12 is an axonometric view of the laying unit for arrangement in trays in a closed position.

For instance, shown in FIG. 12 is a chain 360 for transmitting rotation of the shaft 361 of the electric motor 341 to a pinion 362, the latter being quite analogous to pinion 352.

The laying unit 310 also has a cylinder-piston assembly 370 acting on a bar 371 in turn connected to connecting rods 372, 373.

The connecting rods 372, 373 transmit their movement to respective cranks 374, 375 each of which is able to transmit the rotary motion to the first and second casings 316, 317 to rotate the sets of rollers 311, 312.

Rotation of rollers 311, 312 causes opening of the laying unit 310 and allows the sets of rollers 311, 312 to be brought from the position shown in FIG. 2 to that shown in FIG. 3 and vice versa.

To prevent this movement from being transmitted to shaft 352 too (and the respective shaft 362) bushings (one of which is denoted at 376 in FIG. 9) are provided.

Figure 13:
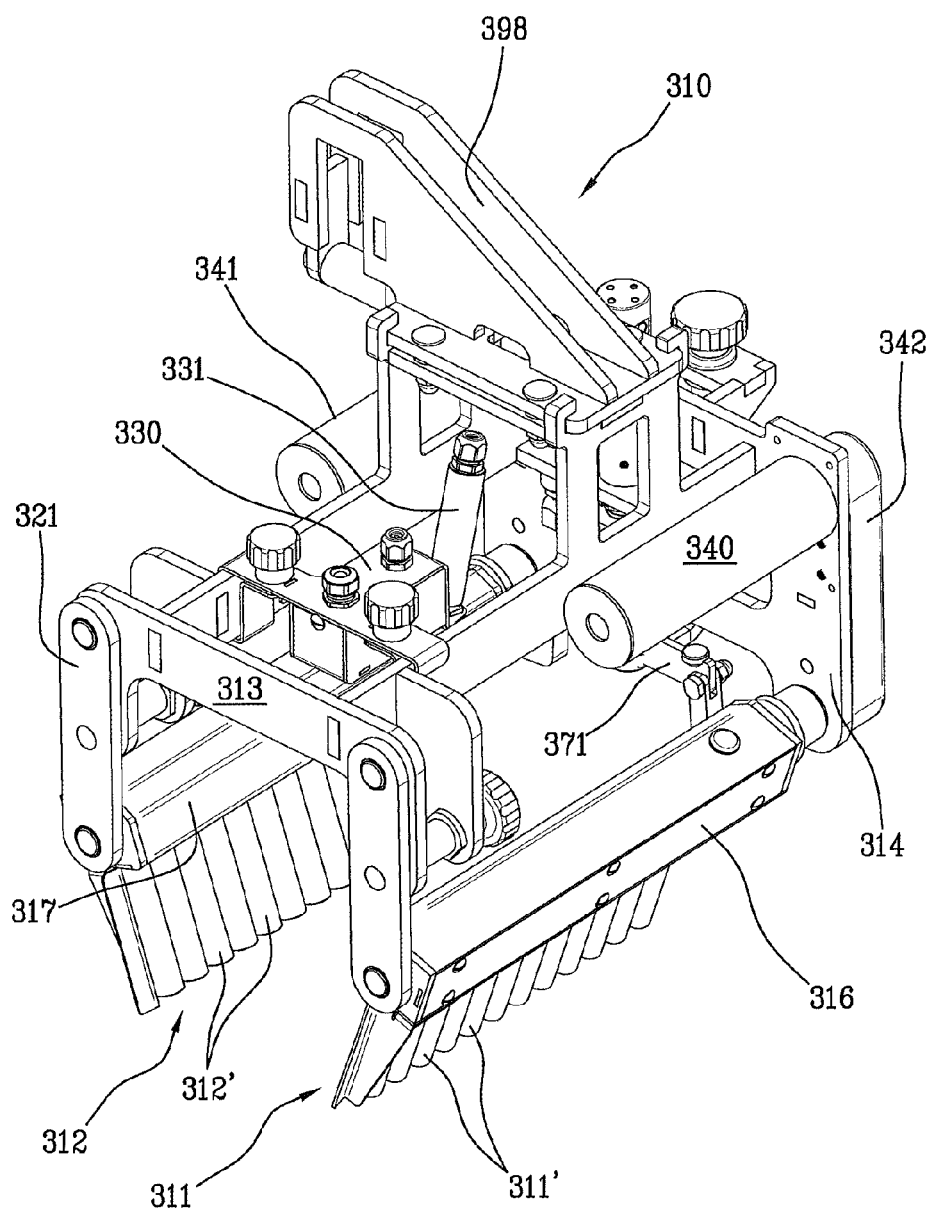
FIG. 13 is an axonometric view of the laying unit for arrangement in trays, in an open position.

Advantageously, according to the invention, the laying unit 310 can be disassembled for periodic cleaning and sanitisation (FIG. 13).

Disassembling takes place through separation of the supporting elements 320, 321 both from the cross member 313 and from the first and second casings 316, 317 and subsequent separation of said casings from the sets of rollers 311, 312 associated therewith.

On operation of the laying unit 310 the meat slices 11 disposed as selected through the interface 60, come from the second conveyor belt 51, 151 in the direction of arrow F of FIG. 2 to be caught and treated by the laying unit 310.

The rotary motion of rollers 311' and 312', driven by motors 48, 49 respectively, enables the meat slices 11 to be disposed in the laying unit 310 on the space made available by the rollers themselves.

The first photoelectric cell 331 is pointed in the direction of the meat slices 11 and is adapted to detect the presence of said slices.

In other words, the laying unit 310 comprises a first photoelectric cell 331, pointed in the direction of the sliced foods 11, adapted to detect the presence of said sliced foods 11.

The first photoelectric cell 331 acts in cooperation with a second photoelectric cell (not shown in the figure).

The second photoelectric cell is adapted to detect the presence of container 390 in the correct position, which container is designed for the group of sliced foods 11 present on the laying unit 310.

In other words, the laying unit 310 comprises a second photoelectric cell adapted to detect the presence of the container 390 for which the group of sliced foods 11 present on the supporting base 400 is intended.

When container 390 is in the position underlying the laying unit 310, the supporting base 400 opens according to the configuration in FIG. 3 to drop the sliced foods 11 into container 390.

The laying unit 310 comprises a second control unit 500 adapted to:
verify the presence of the sliced foods 11 through the first photoelectric cell 331;
verify the presence of containers 390 through the second photoelectric cell;
actuate the means for rotating the sets of rollers so as to release the sliced foods 11 into the containers 390.

The container 390 is then adapted to be routed by a packaging conveyor belt 300 to a packaging station.

Opening of the supporting base 400 takes place by the action of the cylinder-piston assembly 370 acting on bar 371 pushing it downwards so that the connecting rods 372, 373 transmit their motion to the respective cranks 374, 375 and the latter to the respective first casings 316, 317 to rotate the sets of rollers 311, 312 for opening of the supporting base 400 and release of the sliced foods 1 into the container 390.

Figure 14:
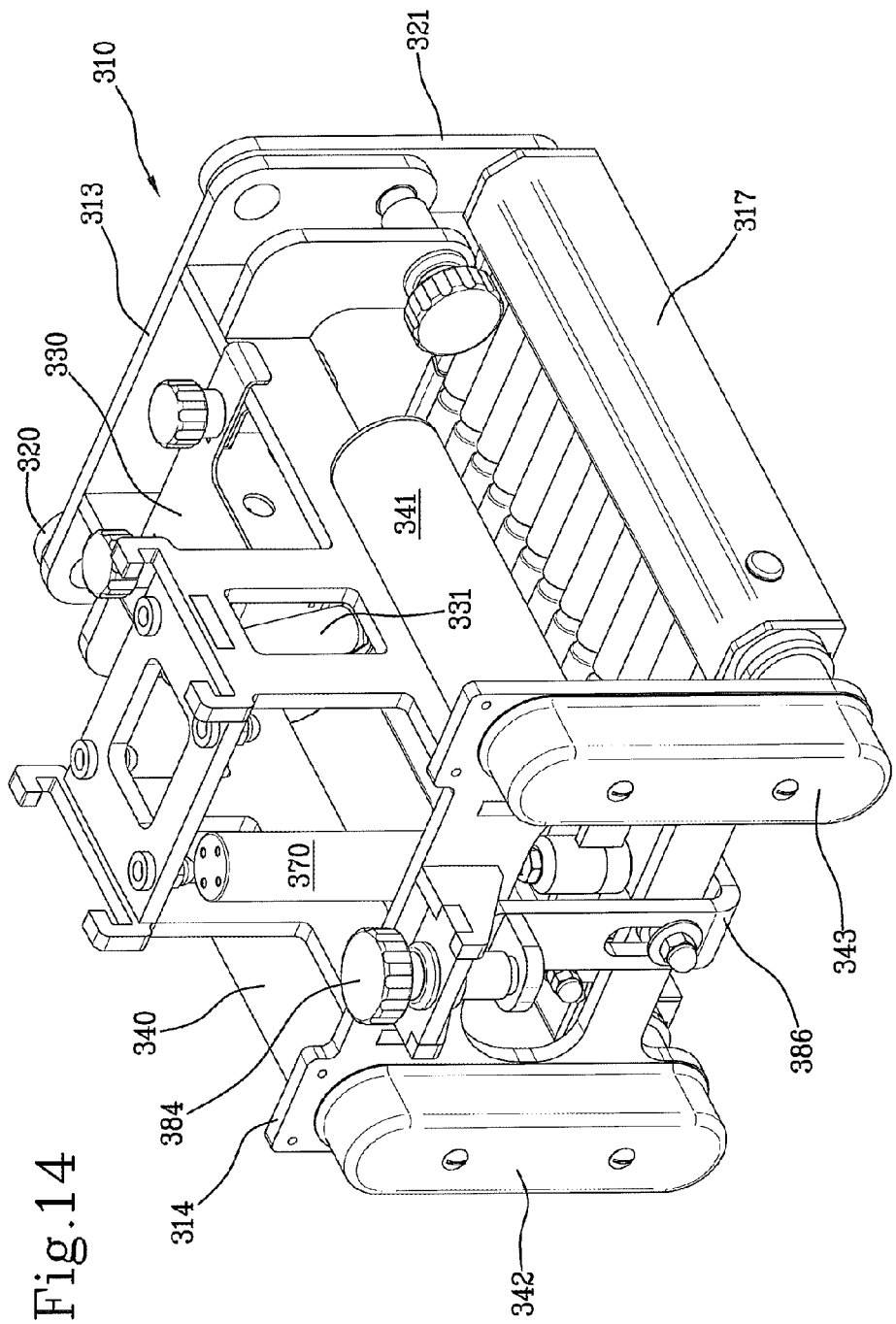
FIG. 14 is an axonometric view of the laying unit for arrangement in trays taken from the side opposite to that in FIG. 12.
Figure 15:
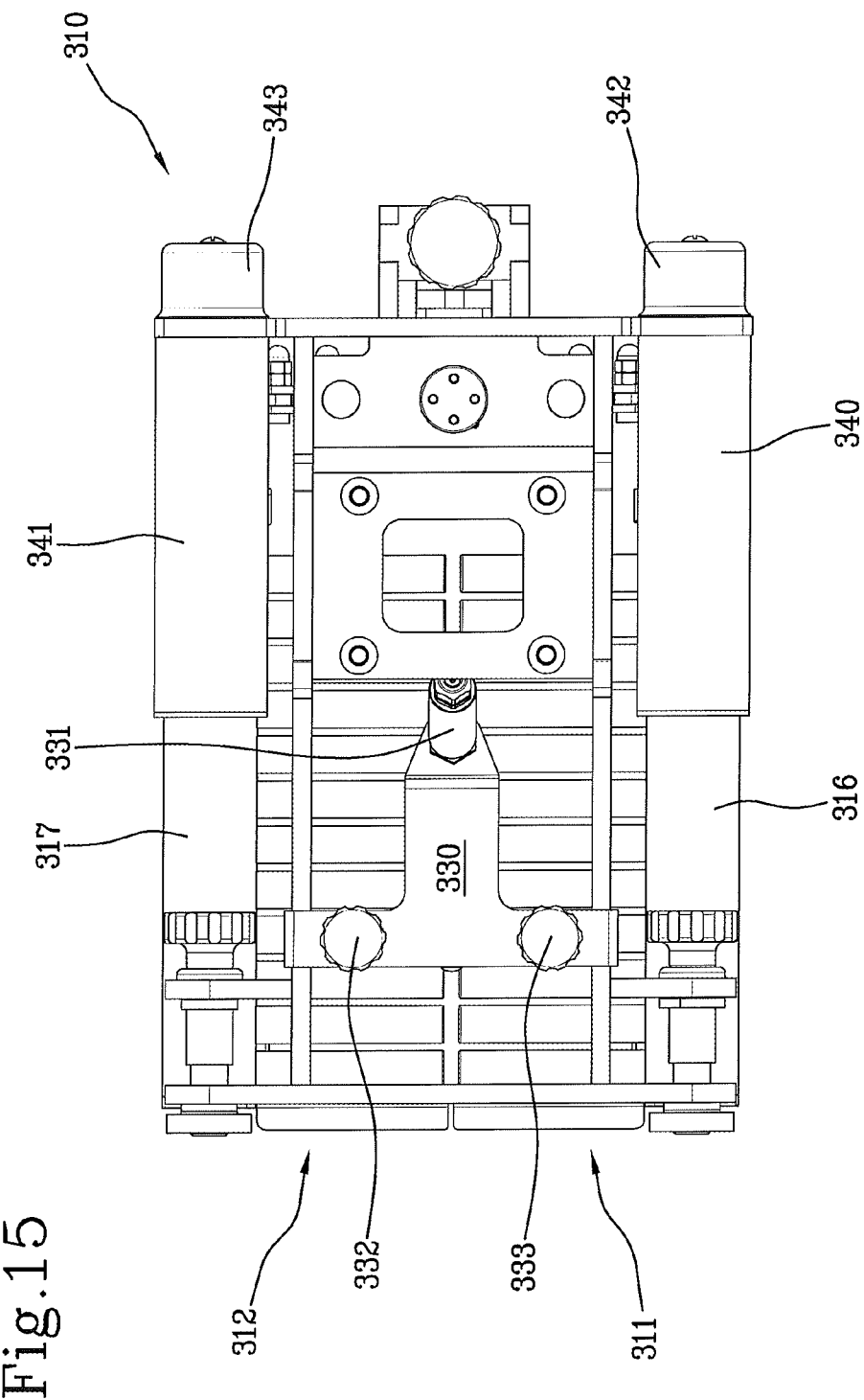
FIGS. 15 and 16 show views from top and bottom respectively, of the laying unit for arrangement in trays.
Figure 16:
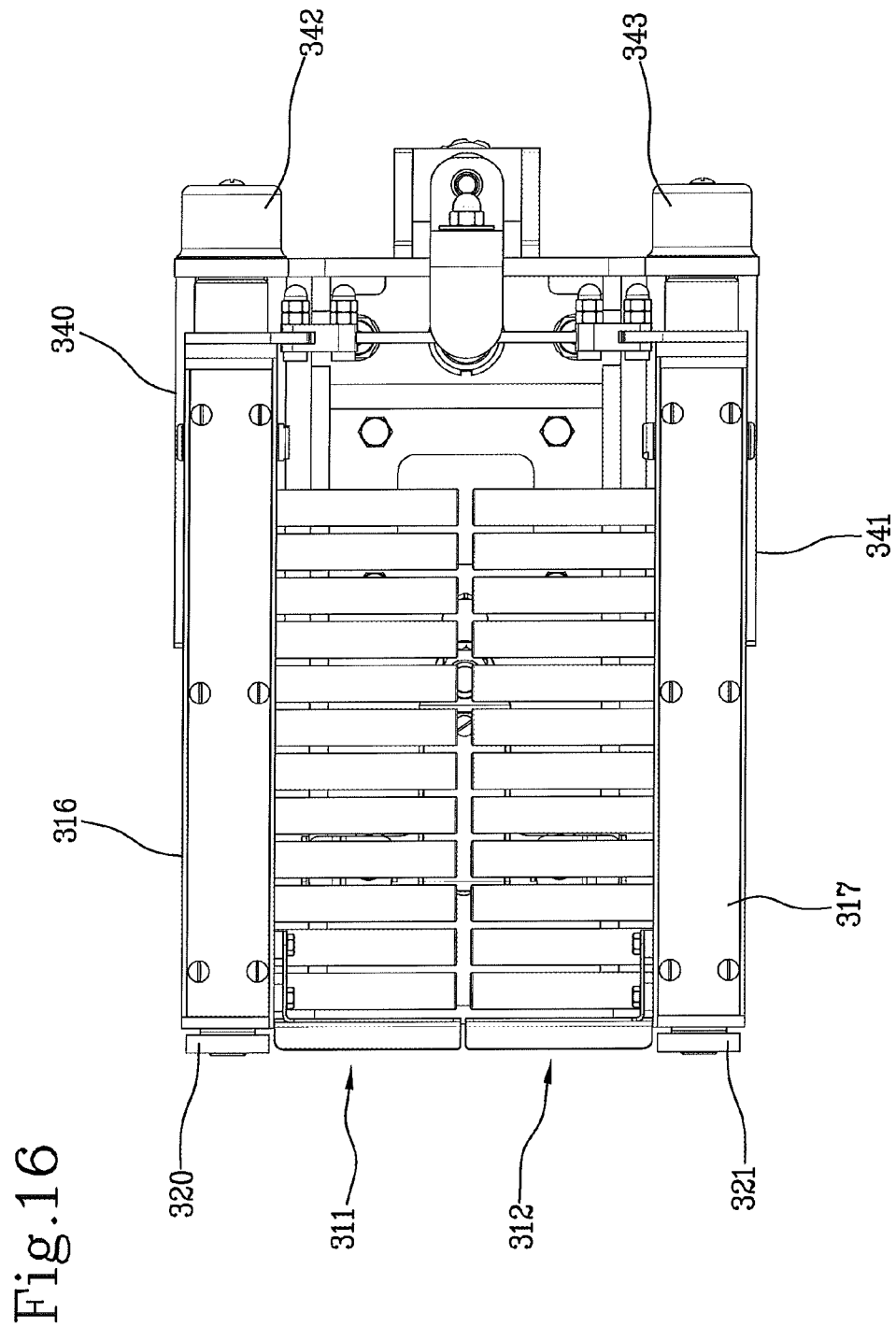
Figure 17:
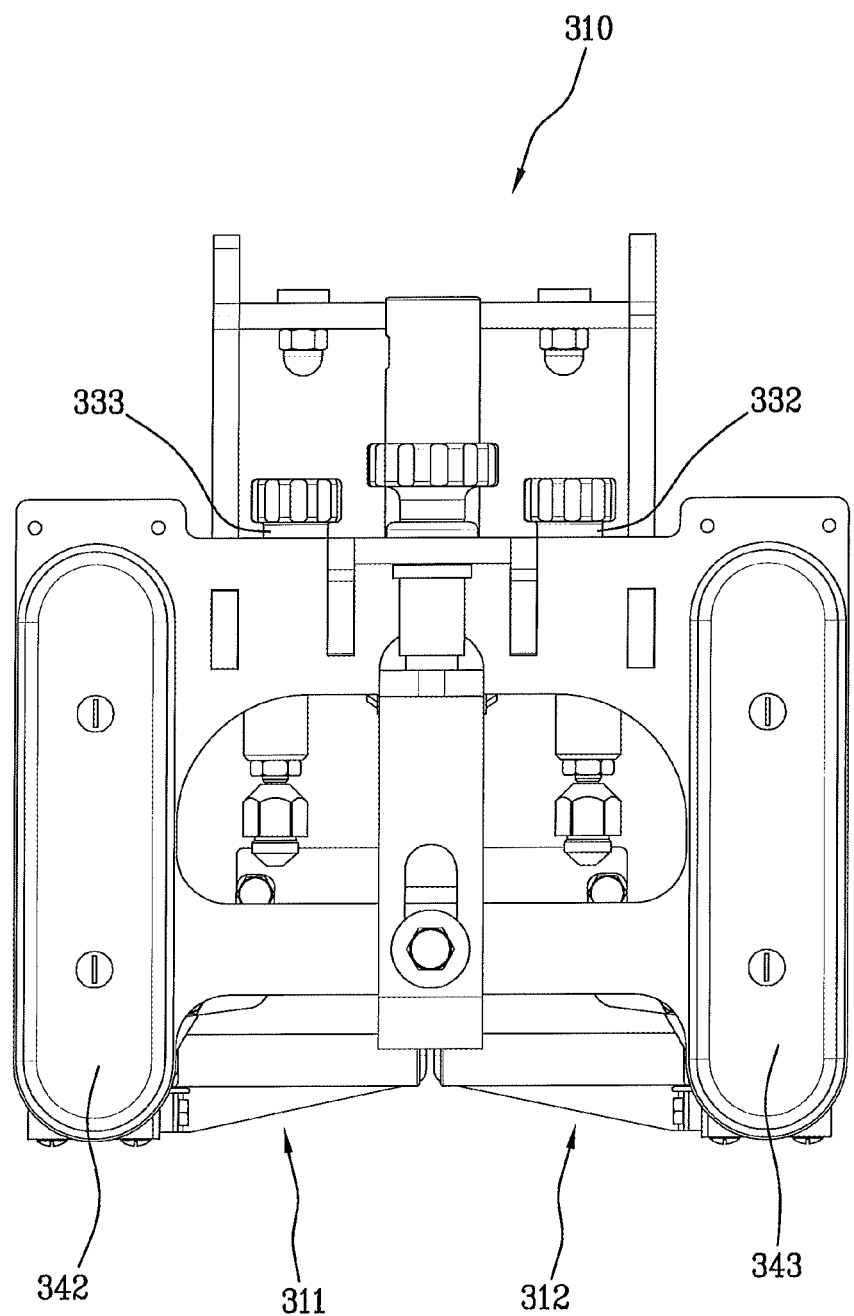
FIGS. 17 and 18 show a rear view and a front view respectively, of the laying unit for arrangement in trays.
Figure 18:
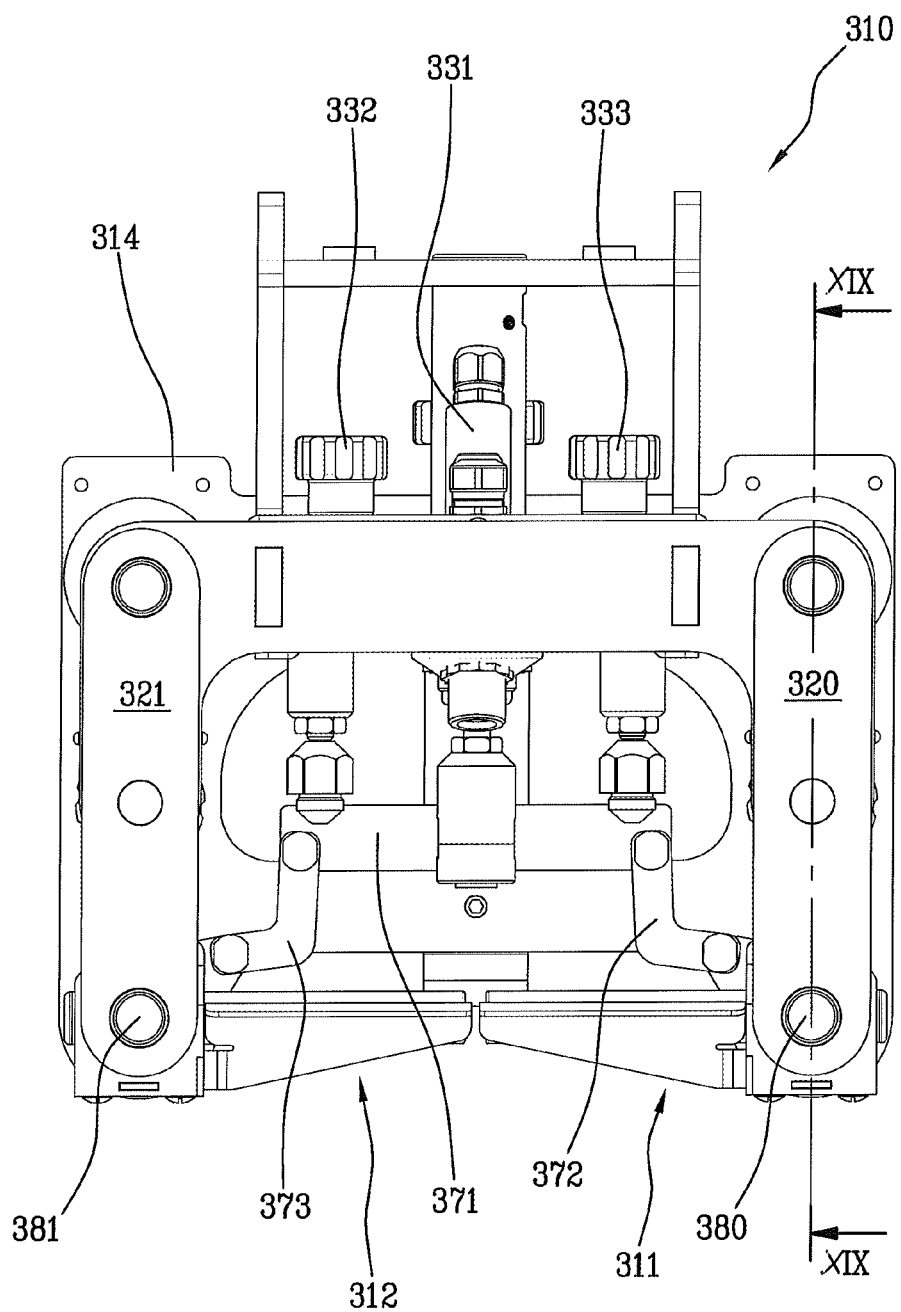
Figure 19:
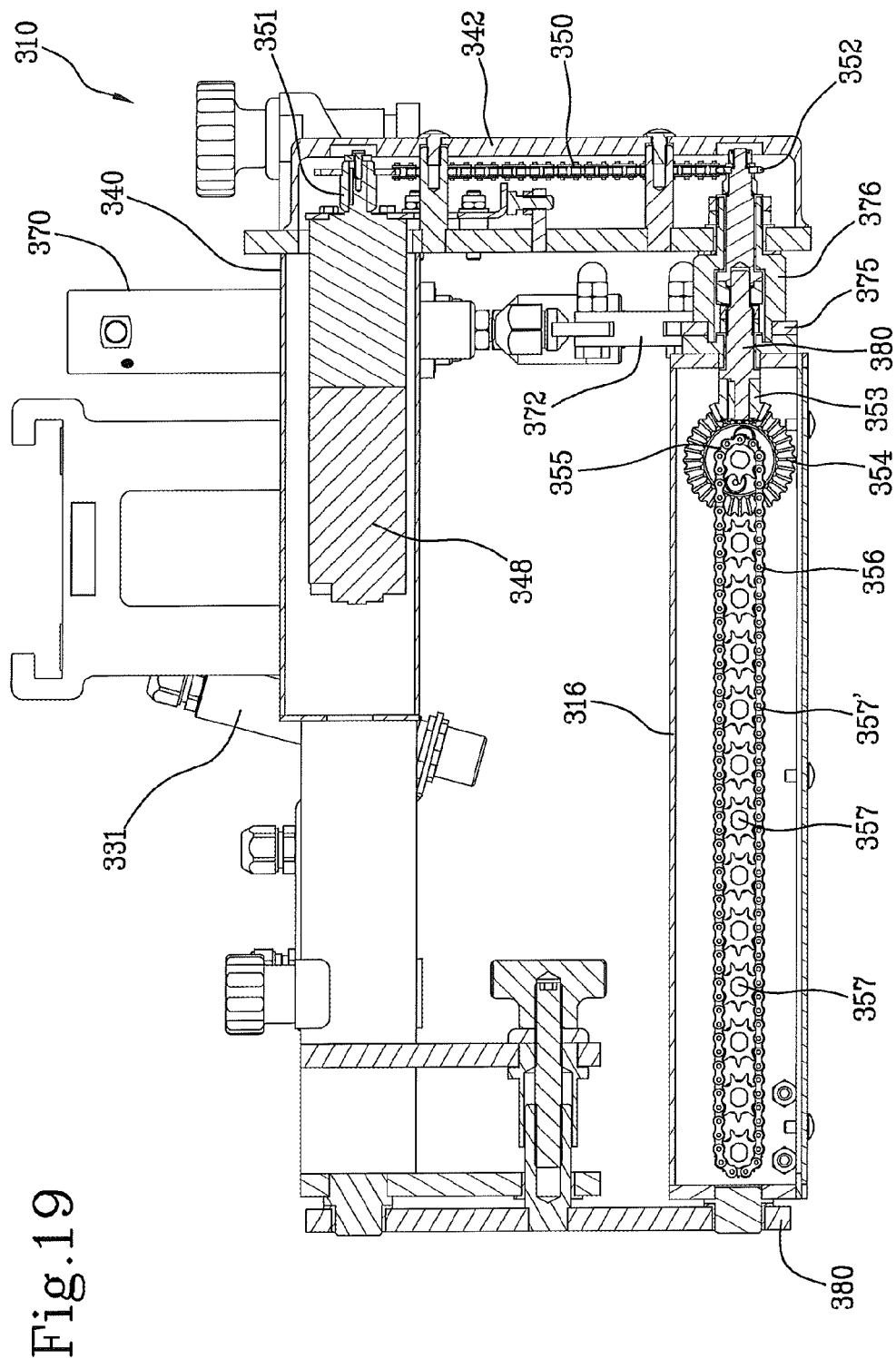
FIG. 19 represents a section taken in plane A-A of FIG. 18.
Figure 20:
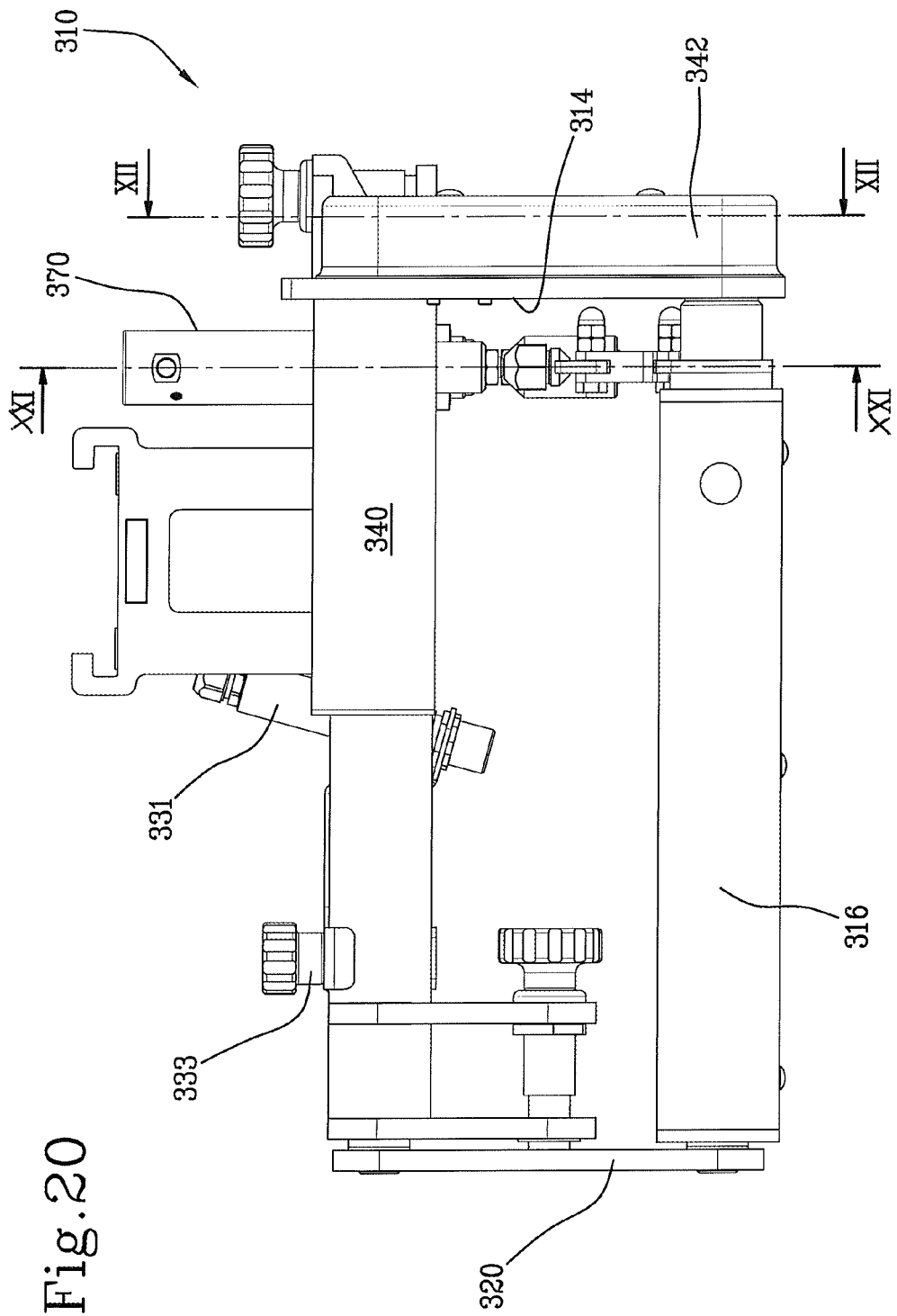
FIG. 20 shows a side view of the laying unit for arrangement in trays.
Figure 21:
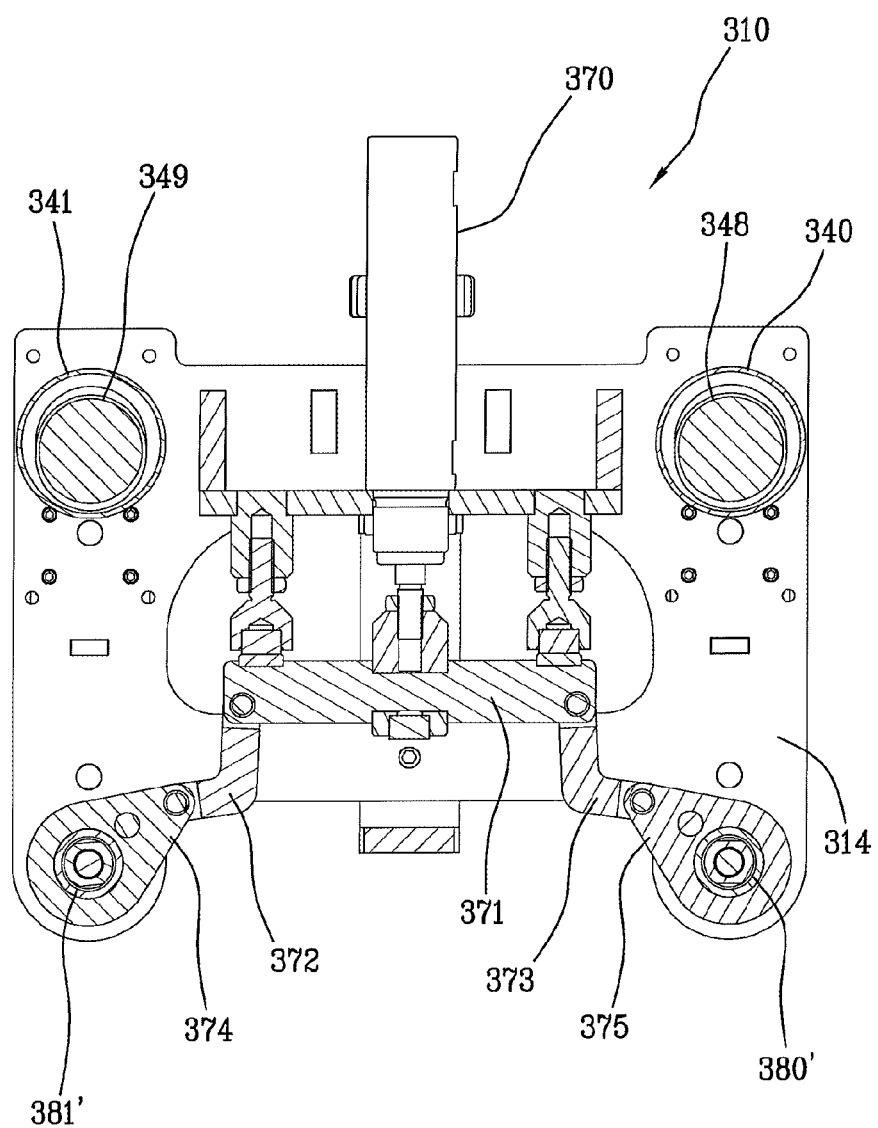
FIG. 21 represents a section taken in plane B-B of FIG. 20.
Figure 22:
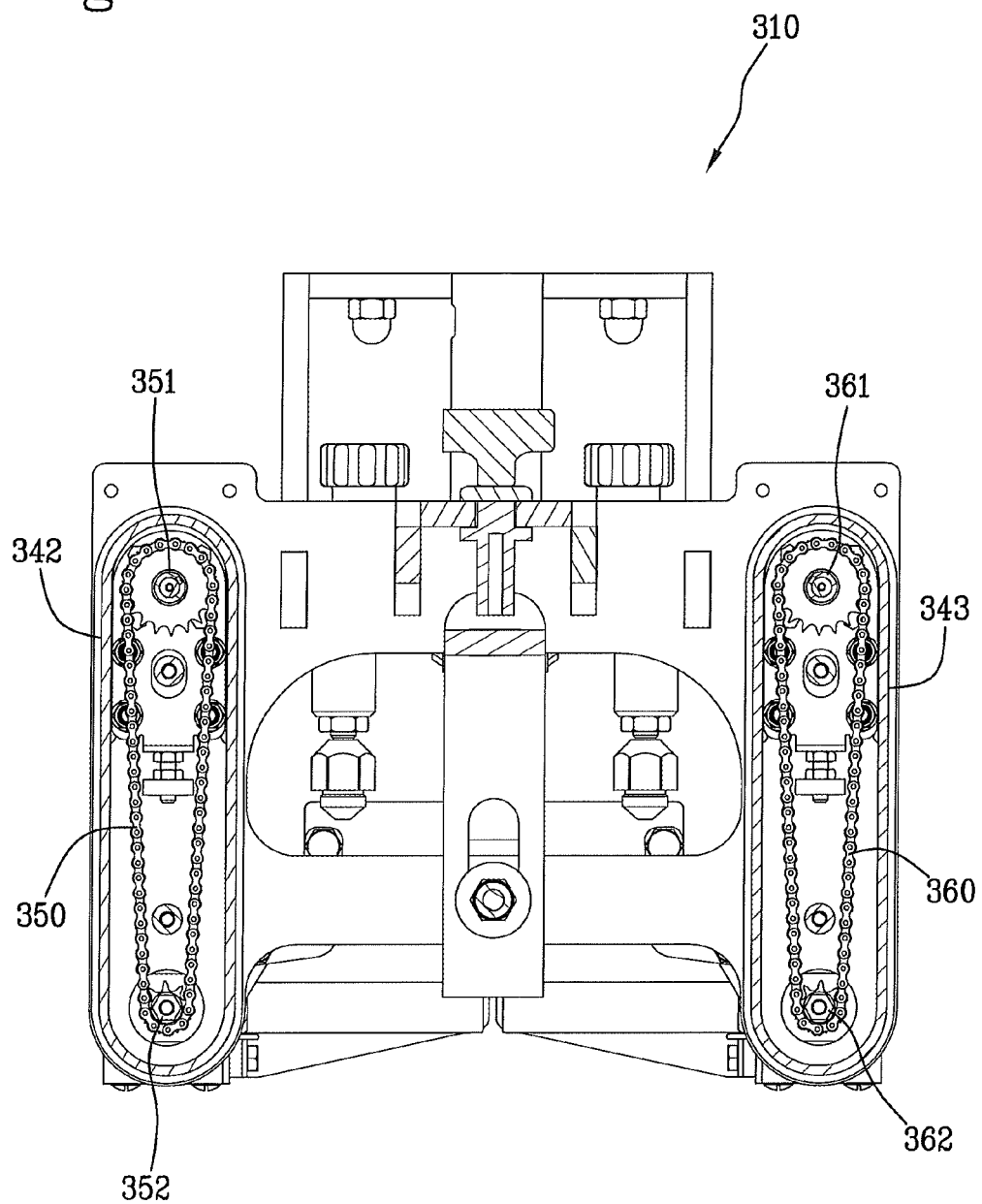
FIG. 22 represents a section taken in plane C-C of FIG. 20.
Figure 23:
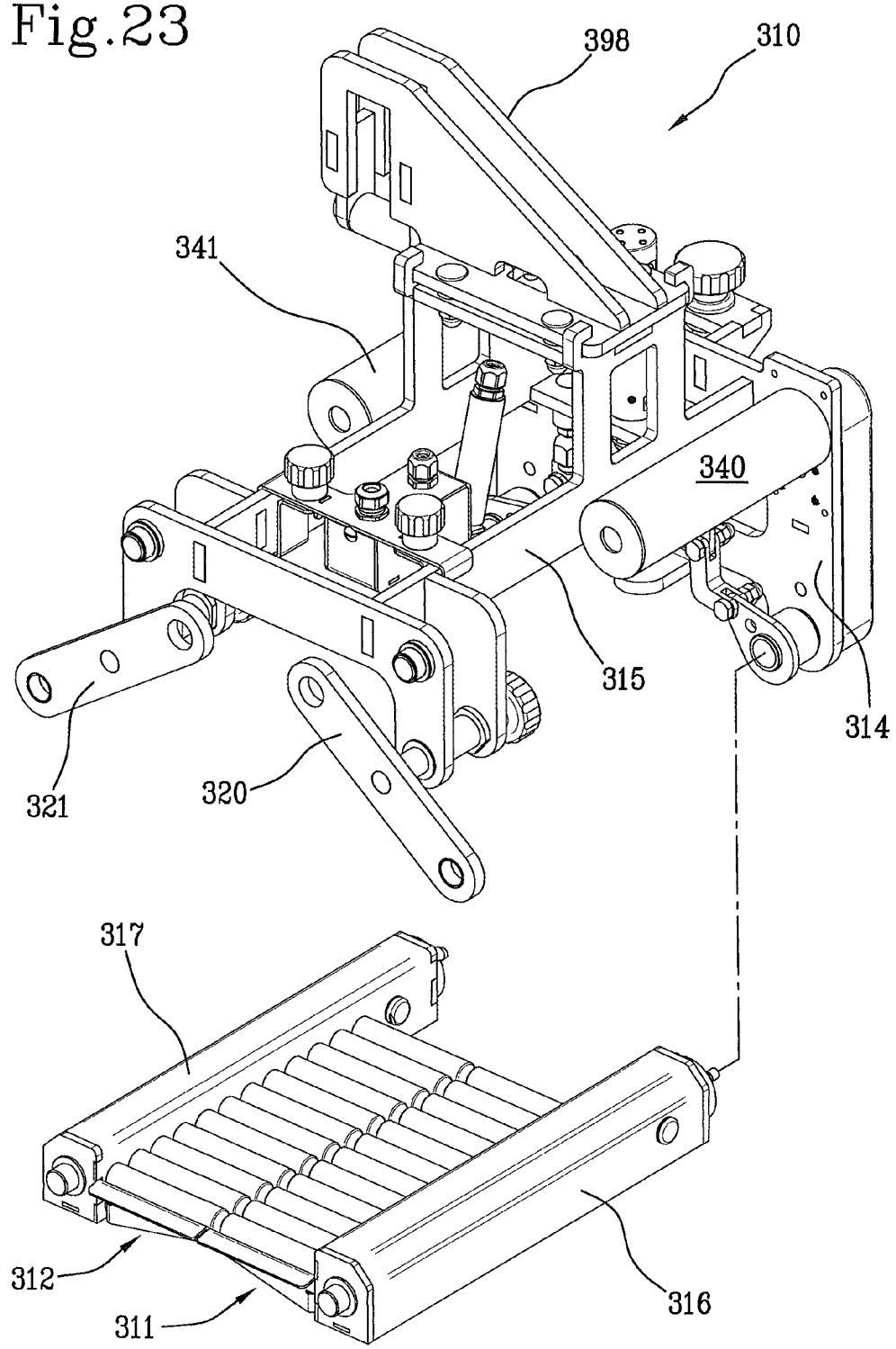
FIG. 23 represents a further operating configuration of the laying unit for arrangement in trays.

Opening of the rollers can be partially reduced by acting on a knob shown in close-up view in FIG. 14. In this manner it is possible to adjust the position of a square 386 connected thereto, thus determining the cylinder 370 stroke.

As previously shown, the laying unit 310 can be disassembled for periodic cleaning or sanitisation by separating the supporting elements 320, 321 both from the cross member 313 and from the first and second casings 316, 317 and subsequently separating said casings from the sets of rollers 311, 312 associated therewith.

According to a variant of the invention, it is possible to provide for the presence in the laying unit 310 of only one set of rollers placed in cantilevered fashion and capable of substantially covering the whole area covered by the two sets of rollers 311, 312 in the previously described embodiment.

In this case, opening of the laying unit 310 can take place only on one side and the inclination of the rollers in the maximum-opening position can be of about 90° for example, to let the slices fall into the container 390.

As already stated above, the apparatus of the invention comprises the control unit 40 in turn comprising the first synchronisation module 41 configured for generating the first adjustment signal S1 adapted to synchronise the sliding speeds of said main 21, 91 and secondary 51, 151 conveyor belts.

As already pointed out above, the apparatus of the invention comprises the control unit 40 in turn comprising the second positioning module 43 configured for generating the third adjustment signal S3 adapted to determine a translation extent in a transverse direction B-B of said main conveyor belt 21, 121.

As already stated above, the apparatus of the invention comprises:
the fourth electromechanical actuator 404 adapted to receive the third adjustment signal S3 from said control unit 40;
the derailleur 26 associated with the supporting pin 25 or the second main driving pin 125.

The fourth electromechanical actuator 404 is adapted to determine said translation extent in the transverse direction B-B of said main conveyor belt 21, 91 by setting a translation extent of said derailleur 26, 126, respectively.

As already pointed out above, the apparatus of the invention comprises the storage unit 90 in turn comprising the auxiliary driving pin 95 jutting out of said support structure 30 in a direction perpendicular to said sliding plane of said storage belt 92.

The apparatus further comprises the sixth electromechanical actuator 406 adapted to:
receive said fifth adjustment signal S5 from said control unit 40 and
set a rotation speed of said auxiliary driving pin 95, as a function of said fifth adjustment signal S5 so as to synchronise the peripheral sliding speed of said storage belt 92 with the peripheral sliding speed of said second main conveyor belt 121.

As already stated above, the apparatus of the invention comprises the supporting base 400 in turn comprising at least one set 311, 312 of powered rollers.

As already pointed out above, the supporting base 400 comprises at least one set 311, 312 of powered rollers in which each said set of rollers 311, 312 is made up of a plurality of individual rollers 311', 312'.

As already stated above, the apparatus of the invention comprises the laying unit 310 in turn comprising a first and a second casing 316, 317 which are associated with said sets of rollers 311, 312, respectively.

As already stated above, the first and second casings 316, 317 each comprise motion-transmitting members to impose a rotary movement to each roller 311', 312' around the axis thereof so as to receive said sliced foods 11.

The invention claimed is:

1. An apparatus for laying sliced foods (11) into containers (390), wherein said sliced foods (11) are fed in a forward-movement direction (A-A'), said apparatus comprising:
a feeding station (80, 180);
a transport station including:
a supporting structure (30);
a main transport unit (20, 91) adapted to receive said sliced foods (11) from said feeding station (80, 180), said main transport station being mounted on said supporting structure (30) and comprising a main conveyor belt (21, 121) for transport of said sliced foods (11), said belt being adapted:
to slide along a sliding plane in the forward-movement direction (A-A');
to translate in a transverse direction (B-B) relative to said forward-movement direction (A-A') along said sliding plane;
a secondary transport unit (50, 150), mounted on said supporting structure (30) as well, and positioned downstream of said main transport unit (20, 91), said secondary transport unit (50, 150) comprising a secondary conveyor belt (51, 151) adapted:
to receive said sliced foods (11) from said main conveyor belt (21, 121);
to slide in said forward-movement direction (A-A') for depositing said sliced foods (11) in said containers (390);
a user interface (60) configured for allowing an input of at least one arrangement parameter (P1, P2) representative of an arrangement of said sliced foods (11) in said containers (390);
a control unit (40) configured for:
receiving said at least one arrangement parameter (P1, P2) from said user interface (60);
generating at least one adjustment signal (S1, S2, S3, S4, S5) for said transport station, to carry out said arrangement in said containers (390) as a function of the selection carried out through said at least one arrangement parameter (P1, P2), wherein said control unit (40) comprises a third positioning module (44) configured for generating a fourth adjustment signal (S4) adapted to determine a raising extent of an average height of said secondary conveyor belt (51, 151).

2. An apparatus as claimed in claim 1, wherein said control unit (40) comprises a first positioning module (42) configured for generating a second adjustment signal (S2) adapted to determine a periodic displacement of said secondary conveyor belt (51, 151).

3. An apparatus as claimed in claim 1, wherein:
said main transport unit (20, 91) comprises a main driving pin (24, 125) jutting out of said supporting structure (30) in a direction perpendicular to said sliding plane of said main conveyor belt (21, 91);
said secondary conveyor belt (50, 150) comprises a secondary driving pin (35);
said apparatus comprises a first (401), a second (402) and a third (403) electromechanical actuator, which actuators are adapted:
to receive said first adjustment signal (S1) from said control unit (40), and
to synchronise the running speeds of said main (21, 121) and secondary (51, 151) conveyor belts by inputting the same peripheral speed thereof and respectively adjusting, as a function of said main adjustment signal (S1), the rotation speed of said first main driving pin (24) through said first actuator (401), of said second main driving pin (125) through said second actuator (402) and of said secondary driving pin (35) through said third actuator (403).

4. An apparatus as claimed in claim 3, wherein said third electromechanical actuator (403) is adapted:
to receive said second adjustment signal (S2) from said control unit (40), and
to determine said periodic displacement of said secondary conveyor belt (51, 151), obtained through input of frequency and amplitude of the alternated backwards and forwards sliding movement thereof, by acting on the rotation of said secondary driving pin (35).

5. An apparatus as claimed in claim 1, comprising a fifth electromechanical actuator (405), in turn comprising an elevator assembly (58), said fifth electromechanical actuator (405) being adapted:
to receive said fourth adjustment signal (S4) from said control unit (40), and
to determine said raising extent of an average height of said secondary conveyor belt (51, 151) through the action of said elevator assembly.

6. An apparatus as claimed in claim 1 wherein said control unit (40) comprises a sixth positioning module (46) configured for generating a sixth adjustment signal (S6) adapted to determine a variation in inclination of said primary conveyor belt (21, 121), specifically of a final head (23, 123).

7. An apparatus as claimed in claim 6 comprising a seventh electromechanical actuator (407) comprising an inclination assembly (68, 168), said seventh electromechanical actuator (407) being adapted:
- to receive said sixth adjustment signal (s6) from said control unit (40);
- to determine said variation of inclination of said primary conveyor belt (21, 121), specifically of said final head (23, 123) by means of the action of said inclination assembly (68, 168).

8. An apparatus as claimed in claim 1, wherein said second main transport unit (91) comprises a third main conveyor belt (120) upstream of said second main conveyor belt (121) for transport of said sliced foods (11), said belt being adapted to run along a sliding plane in the forward-movement direction (A-A') for transporting said sliced foods (11) from said second feeding station (180) to said second main conveyor belt (121).

9. An apparatus as claimed in claim 1, comprising a storage unit (90) mounted on said supporting structure (30), the storage unit (90) comprising a storage belt (92) for temporary stocking said sliced foods (11), said belt (92) being adapted to run along at least one sliding plane in a forward-movement direction (A-A') or backward-movement direction (A-A).

10. An apparatus as claimed in claim 9, wherein
said control unit (40) comprises a second synchronisation module (45) configured for generating a fifth adjustment signal (S5) adapted to synchronise the running speeds of said storage belt (92) and said second main conveyor belt (121);
said storage unit (90) comprises an auxiliary driving pin (95) jutting out of said supporting structure (30) in a direction perpendicular to said sliding plane of said storage belt (92);
said apparatus comprises a sixth electromechanical actuator (406), adapted:
- to receive said fifth adjustment signal (S5) from said control unit (40); and
- to input a rotation speed of said auxiliary driving pin (95) as a function of said fifth adjustment signal (S5) so as to synchronise the peripheral running speeds of said storage belt (92) with the peripheral running speeds of said second main conveyor belt (121).

11. An apparatus as claimed in claim 1, wherein said control unit (40) is configured for determining one or more of:
a forward-movement direction of the main belt (21, 121);
a translation direction and width of the main belt (21, 121, 120);
a forward/backward-movement direction of the secondary belt (51, 151);
a forward/backward-movement width of the secondary belt (51, 151);
a displacement speed of the secondary belt (51, 151);
an inclination of one or more heads of said conveyor belts (120, 51, 151) in such a manner that said sliced foods (11) are laid in said containers (390) according to one of the following arrangements:
in a single row parallel to the forward-movement direction and partly overlapping each other;
in two rows parallel to the forward-movement direction, partly mutually overlapped, each of them in its own row and with a third row parallel to the forward-movement direction and such disposed as to partly overlap the two first rows;
in two rows parallel to the forward-movement direction, partly mutually overlapped, each in its own row and partly crossed between the two rows;
in two rows parallel to the forward-movement direction, partly mutually overlapped, each in its own row and with a third row parallel to the forward-movement direction and positioned in such a manner as to partly overlap the two first rows.

12. An apparatus as claimed in claim 1, comprising a laying unit (310) disposed downstream of said secondary transport unit (50, 150), and adapted:
- to receive said sliced foods (11), the arrangement of which is based on the selection inputted through said interface (60);
- to detect the presence and correct position of said sliced foods (11);
- to lay said sliced foods (11) into containers (390).

13. An apparatus as claimed in claim 12, wherein said laying unit (310) comprises a supporting base (400) adapted to lay said sliced foods (11) into containers (390) through downward opening of said supporting base (400).

14. An apparatus as claimed in claim 13, wherein said supporting base (400) comprises at least one assembly (311, 312) of powered rollers.

15. An apparatus as claimed in claim 14, wherein said laying unit (310) comprises a first and a second casing (316, 317) respectively associated with said roller assemblies (311, 312), said first and second casings (316, 317) each comprise transmission members for imposing a rotary motion to each roller (311', 312') around its axis so as to receive said sliced foods (11).

16. An apparatus as claimed in claim 14, wherein said plurality of single rollers (311', 312') are parallel to each other and are disposed in overhanging relative to the respective first and second casings (316, 317).

17. An apparatus as claimed in claim 12, wherein said laying unit further comprises means for rotating each roller assembly (311, 312) from a substantially horizontal position adapted to receive said sliced foods (11) to a position inclined to the horizontal and adapted to release said foods (11) into said containers (390).

18. An apparatus as claimed in claim 17, wherein said laying unit (310) comprises
a first photoelectric cell (331) pointing towards the sliced foods (11) and adapted to detect the presence of said sliced foods (11);
a second photoelectric cell adapted to detect the presence of said container (390) for which the group of sliced foods (11) present on the supporting base (400) is intended.

19. An apparatus as claimed in claim 17, wherein said laying unit (310) comprises a second control unit (500) adapted:
to check the presence of said sliced foods (11) through said first photoelectric cell (331);
to check the presence of said containers (390) through said second photoelectric cell;
to operate said means for rotating said roller assemblies (311, 312) so as to release said sliced foods (11) into said containers (390).

20. An apparatus as claimed in claim 16, wherein each said roller assembly (311, 312) is made up of a plurality of single rollers (311', 312').

* * * * *

UNITED STATES PATENT AND TRADEMARK OFFICE
CERTIFICATE OF CORRECTION

PATENT NO. : 9,102,428 B2  
APPLICATION NO. : 13/332894  
DATED : August 11, 2015  
INVENTOR(S) : Grasselli Page 1 of 1

It is certified that error appears in the above-identified patent and that said Letters Patent is hereby corrected as shown below:

In the claims

Column 19 line 16, Claim 8, delete "second".

Column 19 line 18, Claim 8, delete "second".

Column 19 line 22, Claim 8, delete "second".

Signed and Sealed this
Twelfth Day of January, 2016

Michelle K. Lee
*Director of the United States Patent and Trademark Office*